(12) United States Patent
Nishimura

(10) Patent No.: US 11,417,469 B2
(45) Date of Patent: Aug. 16, 2022

(54) MULTILAYER CERAMIC ELECTRONIC COMPONENT

(71) Applicant: Murata Manufacturing Co., Ltd., Nagaokakyo (JP)

(72) Inventor: Ryo Nishimura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 69 days.

(21) Appl. No.: 17/144,191

(22) Filed: Jan. 8, 2021

(65) Prior Publication Data

US 2021/0233713 A1 Jul. 29, 2021

(30) Foreign Application Priority Data

Jan. 24, 2020 (JP) .............................. JP2020-009696

(51) Int. Cl.
| | |
|---|---|
| H01G 4/30 | (2006.01) |
| H01G 4/012 | (2006.01) |
| H01G 2/06 | (2006.01) |
| H01G 4/008 | (2006.01) |
| H01G 4/12 | (2006.01) |

(52) U.S. Cl.
CPC ............... *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC .......... H01G 4/30; H01G 4/065; H01G 4/012; H01G 4/1218; H01G 4/1227; H01G 4/2325; H01G 4/008; H01G 4/0085; H01G 4/12; H01G 4/224; H01G 4/1236
See application file for complete search history.

(56) References Cited

U.S. PATENT DOCUMENTS

| | | | | |
|---|---|---|---|---|
| 5,534,843 | A * | 7/1996 | Tsunoda ............... | H01C 1/1406 338/262 |
| 8,760,814 | B1 * | 6/2014 | Pan ...................... | G11B 5/4833 360/245.1 |
| 2002/0145194 | A1 * | 10/2002 | O'Connor ........... | H01L 23/3735 257/E23.106 |
| 2002/0182448 | A1 * | 12/2002 | van der Kolk ......... | C23C 14/06 428/704 |
| 2006/0093803 | A1 * | 5/2006 | Hwang .............. | G02F 1/133734 427/249.1 |
| 2008/0309997 | A1 | 12/2008 | Ushiro et al. | |
| 2010/0302704 | A1 * | 12/2010 | Ogawa ................. | H01G 4/2325 361/306.3 |
| 2012/0019981 | A1 | 1/2012 | Yoshida | |

(Continued)

FOREIGN PATENT DOCUMENTS

| | | |
|---|---|---|
| JP | 2000-306765 A | 11/2000 |
| JP | 2005-032845 A | 2/2005 |

(Continued)

*Primary Examiner* — Michael P McFadden
(74) *Attorney, Agent, or Firm* — Keating & Bennett, LLP

(57) ABSTRACT

A multilayer ceramic electronic component includes a multilayer body and a protective layer provided at least on a first main surface or a second main surface of the multilayer body, in which the protective layer includes a carbon material, has a carbon content of about 70 atm % or more determined through exclusion of hydrogen, oxygen, and halogen contents, and has a sp3 percentage of about 10% or more as an index of C—C bond type.

20 Claims, 10 Drawing Sheets

(56) References Cited

U.S. PATENT DOCUMENTS

| | | | |
|---|---|---|---|
| 2014/0085767 A1* | 3/2014 | Kang | H01G 13/00 361/301.4 |
| 2019/0385795 A1* | 12/2019 | Yang | H01G 4/30 |
| 2020/0340105 A1 | 10/2020 | Salz et al. | |

FOREIGN PATENT DOCUMENTS

| | | |
|---|---|---|
| JP | 2006-039291 A | 2/2006 |
| JP | 2012-044149 A | 3/2012 |
| JP | 2014-053551 A | 3/2014 |
| JP | 2017-152556 A | 8/2017 |
| WO | 2019/081514 A1 | 5/2019 |

* cited by examiner

MULTILAYER CERAMIC ELECTRONIC COMPONENT

CROSS REFERENCE TO RELATED APPLICATIONS

This application claims the benefit of priority to Japanese Patent Application No. 2020-009696 filed on Jan. 24, 2020. The entire contents of this application are hereby incorporated herein by reference.

BACKGROUND OF THE INVENTION

1. Field of the Invention

The present invention relates to a multilayer ceramic electronic component, and in particular, to a multilayer ceramic electronic component including an external electrode with a multilayer structure.

2. Description of the Related Art

In recent years, electronic devices such as cellular phones and portable music players have become smaller and thinner. In line with this trend, ceramic electronic components have also become smaller and thinner to be accommodated in small, thin electronic devices.

In particular, extremely thin ceramic electronic components have come to be, for example, embedded in circuit boards, or mounted in very narrow spaces even when they are for use on the surface of circuit boards. Therefore, as ceramic electronic components become thinner and thinner, their mechanical strength decreases, which raises a strong demand to ensure that they have sufficient mechanical strength.

Thus, for example, Japanese Unexamined Patent Application, Publication No. 2012-44149 discloses a technique for improving the mechanical strength of a ceramic electronic component, which includes providing reinforcement layers of metal, such as nickel (Ni), inside a first outer layer portion and a second outer layer portion of a ceramic element.

Unfortunately, the structure disclosed in Japanese Unexamined Patent Application, Publication No. 2012-44149 does not have sufficient strength because the surface of the element remains ceramic, in which defects, such as microcracks, exist as potential fracture starting points. Further, if the reinforcement layer is provided such that the necessary strength is achieved, the reinforcement layer will be thicker and thus reduce the volume capacitance density. Therefore, there is now a demand for multilayer ceramic electronic components having a multilayer body that can provide higher electronic component performance and higher mechanical strength within a limited space.

SUMMARY OF THE INVENTION

Preferred embodiments of the present invention provide multilayer ceramic electronic components each having sufficient mechanical strength.

A multilayer ceramic electronic component according to a preferred embodiment of the present invention includes a multilayer body that includes a plurality of stacked ceramic layers and a plurality of internal electrode layers each stacked on the ceramic layer and including a first main surface and a second main surface on opposite sides in a height direction, a first end surface and a second end surface on opposite sides in a longitudinal direction perpendicular or substantially perpendicular to the height direction, and a first side surface and a second side surface on opposite sides in a width direction perpendicular or substantially perpendicular to the height and longitudinal directions; a first external electrode disposed on the multilayer body; a second external electrode disposed on the multilayer body; and a protective layer disposed at least on the first main surface or the second main surface of the multilayer body, the protective layer including a carbon material, having a carbon content of about 70 atm % or more determined through exclusion of hydrogen, oxygen, and halogen contents, and having a sp3 percentage of about 10% or more as an index of C—C bond type.

In this context, "sp3 percentage" indicates bonding between carbon atoms known to be stronger. This means that preferred embodiments of the present invention use a material including stronger carbon-carbon bonding for the protective layer.

This feature makes it possible to provide multilayer ceramic electronic components that are each capable of sufficiently withstanding direct external impact.

Preferred embodiments of the present invention make it possible to provide multilayer ceramic electronic components each having sufficient mechanical strength.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, examples of multilayer ceramic electronic components according to preferred embodiments of the present invention will be described with reference to the drawings.

1. Multilayer Ceramic Capacitor

Figure 1:
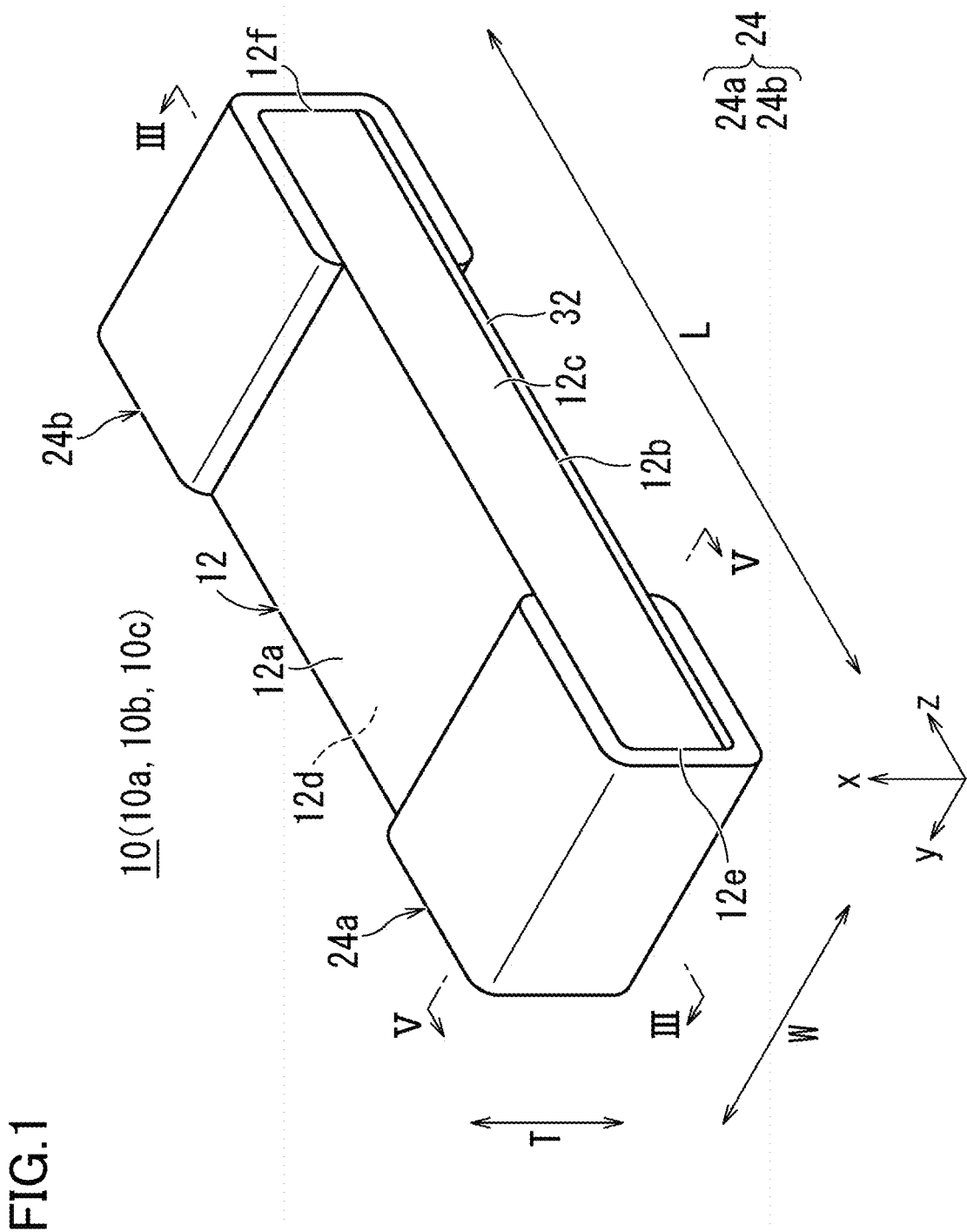
FIG. 1 is an external perspective view showing a multilayer ceramic capacitor as an example of a multilayer ceramic electronic component according to a preferred embodiment of the present invention.
Figure 2:
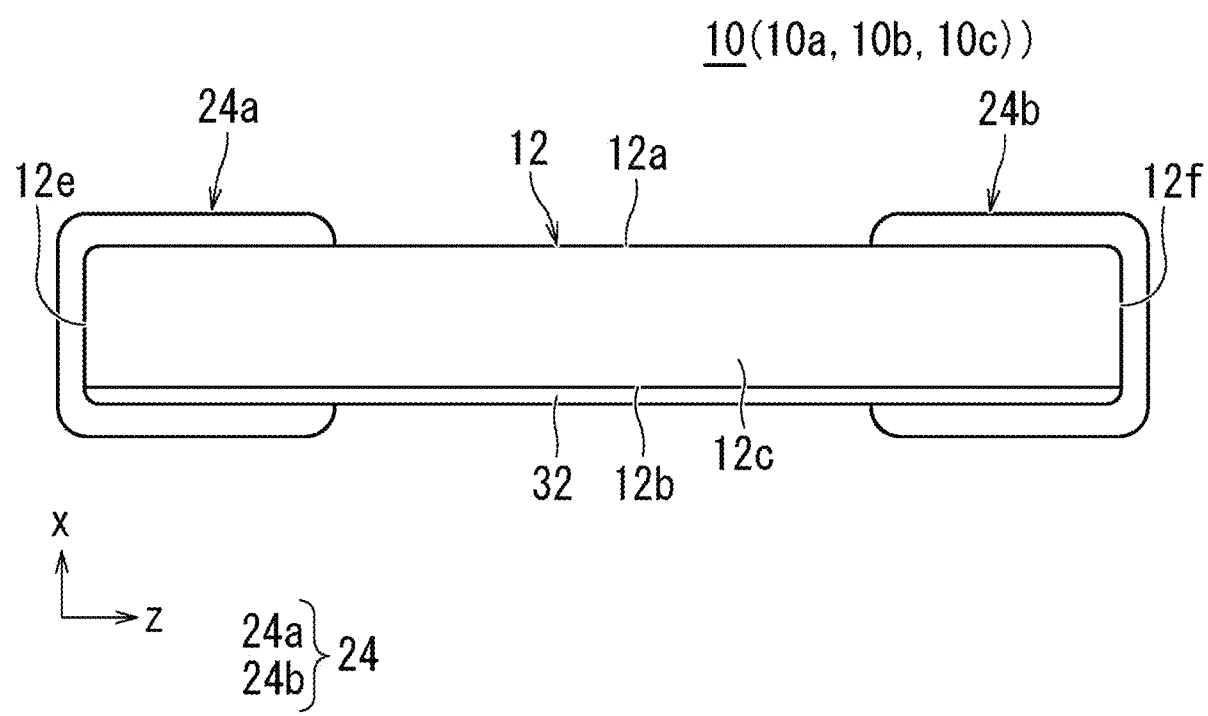
FIG. 2 is a front view showing a multilayer ceramic capacitor as an example of a multilayer ceramic electronic component according to a preferred embodiment of the present invention.
Figure 3:
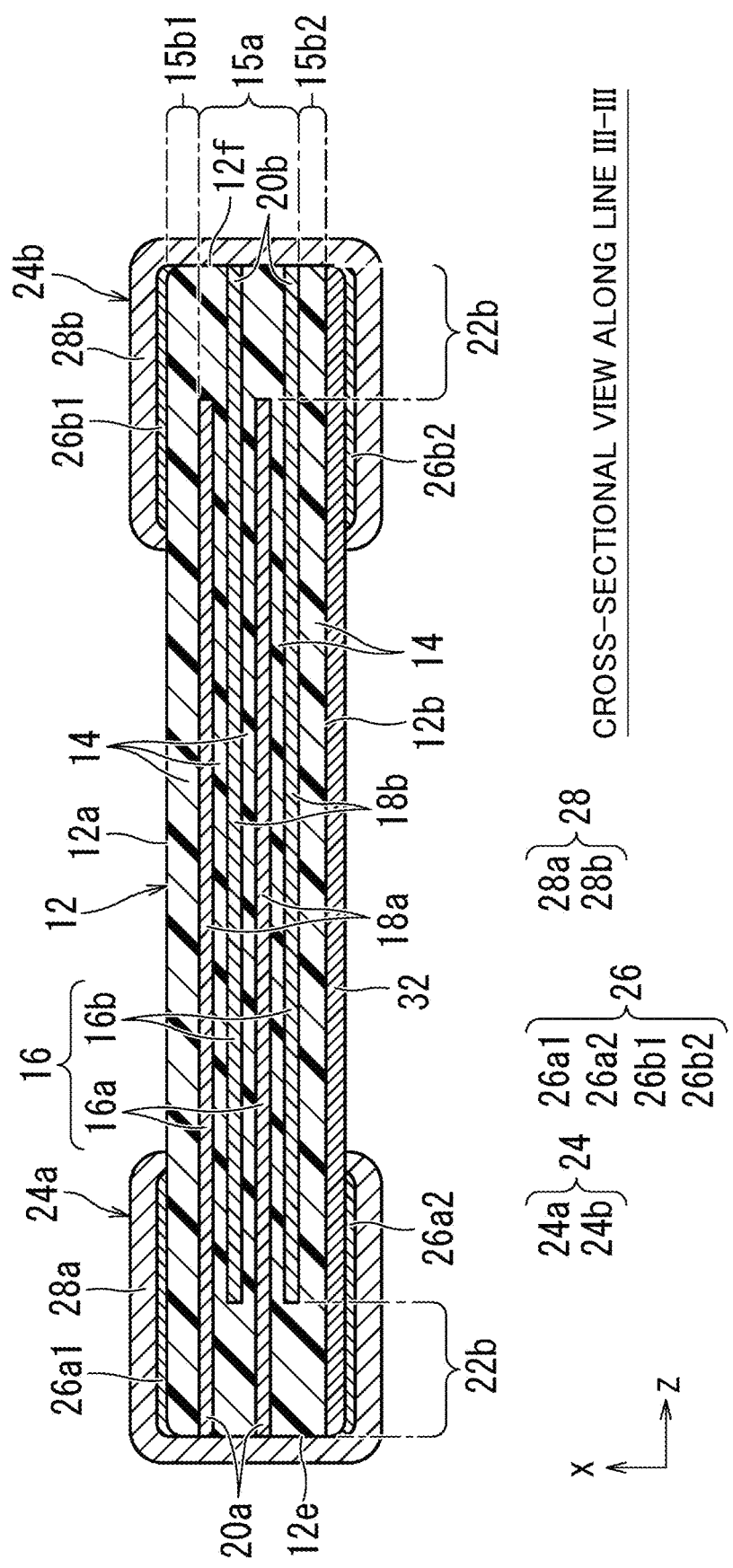
FIG. 3 is a cross-sectional view (central front cross-sectional view) along the line III-III in FIG. 1.
Figure 4:
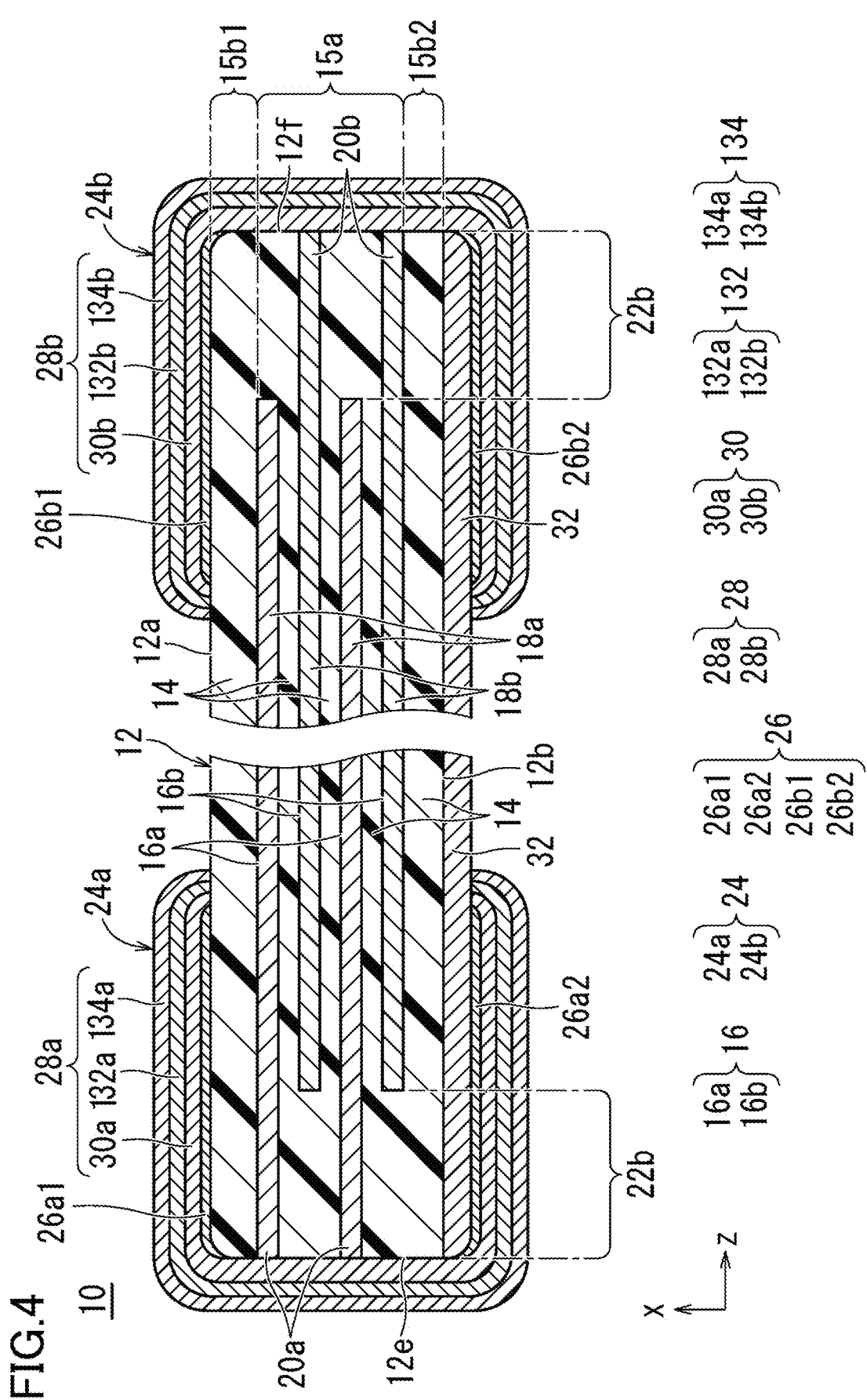
FIG. 4 is an enlarged view of a principal portion shown in FIG. 3.
Figure 5:
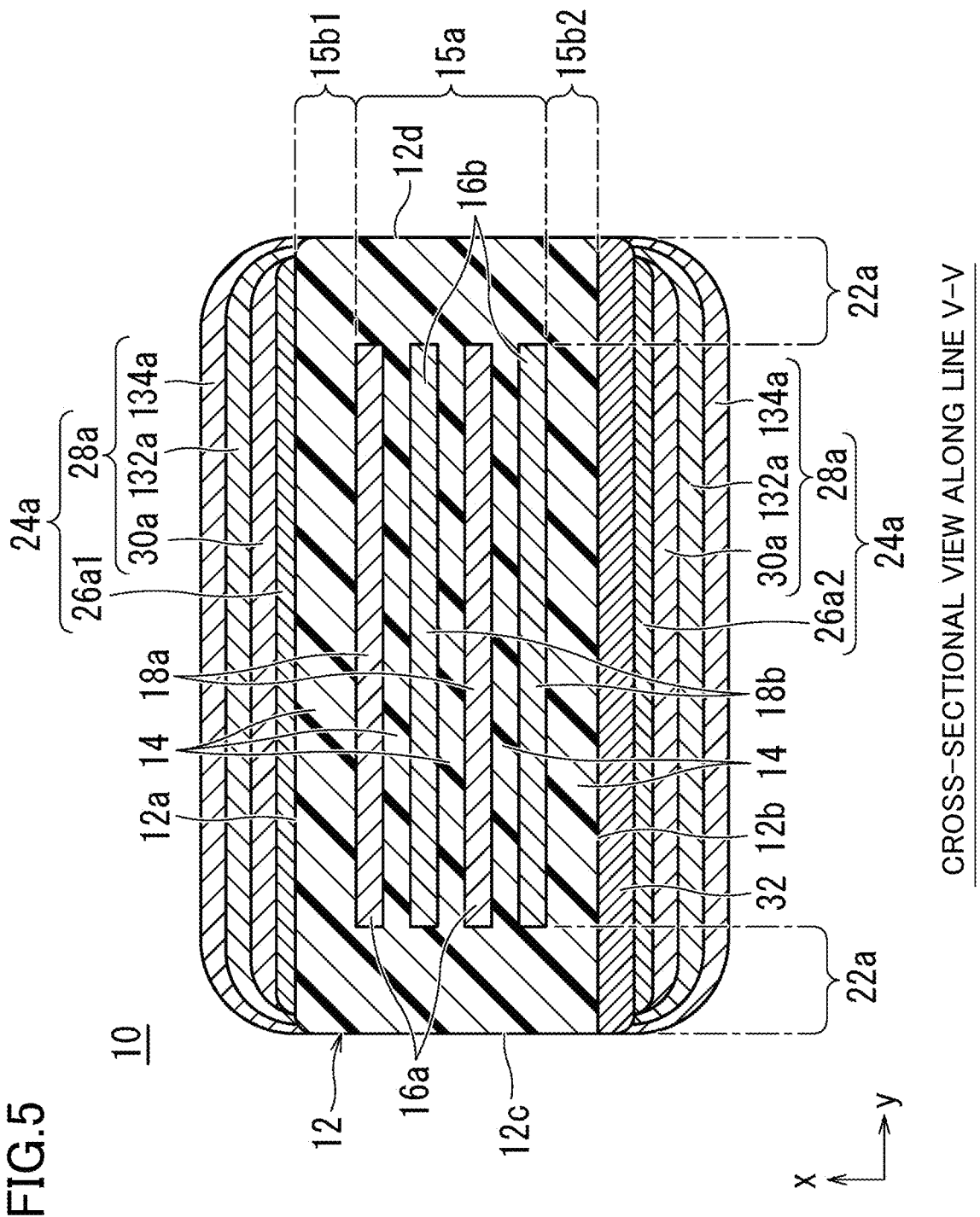
FIG. 5 is a cross-sectional view along the line V-V in FIG. 1.

A multilayer ceramic capacitor 10 will be described as an example of a multilayer ceramic electronic component according to a preferred embodiment of the present invention. FIG. 1 is an external perspective view showing a multilayer ceramic capacitor as an example of a multilayer ceramic electronic component according to a preferred embodiment of the present invention. FIG. 2 is a front view showing a multilayer ceramic capacitor as an example of a multilayer ceramic electronic component according to a preferred embodiment of the present invention, and FIG. 3 is a cross-sectional view (central front cross-sectional view) along the line III-III in FIG. 1. FIG. 4 is an enlarged cross-sectional view of a principal part shown in FIG. 3. FIG. 5 is an enlarged cross-sectional view along the line V-V in FIG. 1.

The multilayer ceramic capacitor 10 includes a multilayer body 12 and external electrodes 24. Hereinafter, the features of the multilayer body 12 and the external electrodes 24 will be described.

Multilayer Body

The multilayer body 12 includes a plurality of ceramic layers 14 and a plurality of internal electrode layers 16, which are stacked. The multilayer body 12 includes a first main surface 12a and a second main surface 12b on opposite sides in the height direction x, a first side surface 12c and a second side surface 12d on opposite sides in the width direction y perpendicular or substantially perpendicular to the height direction x, and a first end surface 12e and a second end surface 12f on opposite sides in the longitudinal direction x perpendicular or substantially perpendicular to the height direction x and the width direction y. The multilayer body 12 is preferably rounded at its corners and ridges. The term "corner" refers to a portion at which three adjacent faces of the multilayer body 12 intersect, and the term "ridge" refers to a portion at which two adjacent faces of the multilayer body 12 intersect. Some or all of the first main surface 12a, the second main surface 12b, the first side surface 12c, the second side surface 12d, the first end surface 12e, and the second end surface 12f may be patterned or textured.

As shown in FIGS. 3 to 5, the multilayer body 12 includes an effective layer portion 15a including the internal electrode layers 16 on opposite sides with the ceramic layer 14 in between in the height direction x connecting the first main surface 12a and the second main surface 12b; a first outer layer portion 15b1 including the ceramic layers 14 located between the first main surface 12a and the internal electrode 16 closest to the first main surface 12a; and a second outer layer portion 15b2 including the ceramic layers 14 located between the second main surface 12b and the internal electrode layer 16 closest to the second main surface 12b.

The first outer layer portion 15b1, which is located adjacent to the first main surface 12a of the multilayer body 12, is an assembly of the ceramic layers 14 located between the first main surface 12a and the internal electrode layer 16 closest to the first main surface 12a.

The second outer layer portion 15b2, which is located adjacent to the second main surface 12b of the multilayer body 12, is an assembly of the ceramic layers 14 located between the second main surface 12b and the internal electrode layer 16 closest to the second main surface 12b.

The effective layer portion 15a is a region between the first outer layer portion 15b1 and the second outer layer portion 15b2. The number of the stacked ceramic layers 14 including those in the first outer layer portion 15b1 and the second outer layer portion 15b2 is preferably, but not limited to, 15 or more and 70 or less, for example. Each ceramic layer 14 preferably has a thickness of about 0.4 µm or more and about 10 µm or less, for example.

Each ceramic layer 14 may preferably be made of a dielectric ceramic made mainly of $BaTiO_3$, $CaTiO_3$, $SrTiO_3$, $CaZnO_3$, or the like, for example. Besides such a main component, each ceramic layer 14 may include an additional subcomponent, such as a Mn compound, an Fe compound, a Cr compound, a Co compound, or a Ni compound, for example.

The dimensions of the multilayer body 12 are, preferably, but not limited to, for example, about 0.2 mm or more and about 1 mm or less in the longitudinal direction z, about 0.1 mm or more and about 10 mm or less in the width direction y, and about 30 µm or more and about 200 µm or less in the height direction x. In particular, the present preferred embodiment is more effective for the multilayer body 12 with a smaller dimension in the height direction x of the multilayer body 12. This is because the mechanical strength of the multilayer body 12 decreases with decreasing dimensions in the height direction x.

Inside the multilayer body 12, the multilayer ceramic capacitor 10 as a multilayer ceramic electronic component according to the present preferred embodiment includes no additional protective layer to increase strength while maintaining the desired basic performance. In the present preferred embodiment, the multilayer ceramic capacitor 10 has high strength while maintaining the desired basic performance.

Internal Electrode Layers

As shown in FIGS. 3 to 5, the internal electrode layers include a first internal electrode layer 16a and a second internal electrode layer 16b.

The first internal electrode layer 16a includes a first counter electrode portion 18a facing the second internal electrode layer 16b; and a first extension electrode portion 20a provided as an end portion of the first internal electrode layer 16a to extend from the first counter electrode portion 18a to the first end surface 12e of the multilayer body 12. The first extension electrode portion 20a extending to the first end surface 12e includes an end exposed at the first end surface 12e.

In the first internal electrode layer 16a, the shape of the first counter electrode portion 18a is preferably, but not limited to, rectangular or substantially rectangular in plan view, for example. It may include corner portions rounded or obliquely shaped (tapered) in plan view. It may also be inclined and tapered in either direction in plan view.

In the first internal electrode layer 16a, the shape of the first extension electrode portion 20a is preferably, but not limited to, rectangular or substantially rectangular in plan view, for example. It may include corner portions rounded or obliquely shaped (tapered) in plan view. It may also be inclined and tapered in either direction in plan view.

In the first internal electrode layer 16a, the width of the first counter electrode portion 18a may be equal to, larger, or smaller than the width of the first extension electrode portion 20a.

The second internal electrode layer 16b includes a second counter electrode portion 18b facing the first internal electrode layer 16a; and a second extension electrode portion 20b provided as an end portion of the second internal electrode layer 16b to extend from the second counter electrode portion 18b to the second end surface 12f of the multilayer body 12. The second extension electrode portion 20b extending to the second end surface 12f includes an end exposed at the second end surface 12f.

In the second internal electrode layer 16b, the shape of the second counter electrode portion 18b is preferably, but not limited to, rectangular or substantially rectangular in plan view, for example. It may include corner portions rounded or obliquely shaped (tapered) in plan view. It may also be inclined and tapered in either direction in plan view.

In the second internal electrode layer 16b, the shape of the second extension electrode portion 20b is preferably, but not limited to, rectangular or substantially rectangular in plan view, for example. It may include corner portions rounded or obliquely shaped (tapered) in plan view. It may also be inclined and tapered in either direction in plan view.

In the second internal electrode layer 16b, the width of the second counter electrode portion 18b may be equal to, larger, or smaller than the width of the second extension electrode portion 20b.

As shown in FIG. 5, the multilayer body 12 includes side portions (hereinafter referred to as "W gaps") 22a between the first side surface 12c and one end of the first counter electrode portion 18a and one end of the second counter electrode portion 18b in the width direction y and between the second side surface 12d and the other end of the first counter electrode portion 18a and the other end of the second counter electrode portion 18b in the width direction y.

As shown in FIGS. 3 and 4, the multilayer body 12 further includes end portions (hereinafter referred to as "L gaps") 22b between the second end surface 12f and an end of the first internal electrode layer 16a opposite to the first extension electrode portion 20a and between the first end surface 12e and an end of the second internal electrode layer 16b opposite to the second extension electrode portion 20b.

The first internal electrode layer 16a and the second internal electrode layer 16b may each preferably include an appropriate electrically conductive material, such as a metal including at least one of, for example, Ni, Cu, Ag, Pd, or Au or an alloy including at least one of them, such as a Ag—Pd alloy.

When a piezoelectric ceramic is used to make the multilayer body 12, the multilayer ceramic electronic component can define and function as a ceramic piezoelectric element 10a. Examples of the piezoelectric ceramic material include lead zirconate titanate (PZT) ceramic materials.

When a semiconductor ceramic is used to make the multilayer body 12, the multilayer ceramic electronic component can define and function as a thermistor element 10b. Examples of the semiconductor ceramic material include spinel ceramic materials.

When a magnetic ceramic is used to make the multilayer body 12, the multilayer ceramic electronic component can define and function as an inductor element 10c. Further, for the function as an inductor element, the internal electrode layers are coiled conductors. Examples of the magnetic ceramic material include oxide materials.

As described above, the multilayer body 12 may be made using various appropriate materials and structures, so that the ceramic electronic component 1 according to the present preferred embodiment can advantageously define and function not only as a multilayer ceramic capacitor 10, but also as a ceramic piezoelectric element 10a, a thermistor element 10b, or an inductor element 10c.

The internal electrode layers 16, specifically, the first internal electrode layer 16a and the second internal electrode layer 16b preferably have a thickness of about 0.2 μm or more and about 2.0 μm or less, for example. The total number of the first internal electrode layer 16a and the second internal electrode layer 16b is preferably 15 or more and 200 or less, for example.

The internal electrode layers 16 may be provided parallel, substantially parallel, perpendicular, or substantially perpendicular, and preferably parallel or substantially parallel, to the surface to be mounted on a mounting board.

External Electrodes

As shown in FIGS. 1 to 5, the external electrodes 24 are disposed adjacent to the first end surface 12e and the second end surface 12f of the multilayer body 12.

Each external electrode 24 includes foundation electrode layers 26 and plated layers 28 provided on the first end surface 12e or the second end surface 12f.

The external electrodes 24 include a first external electrode 24a and a second external electrode 24b. The first external electrode 24a is disposed over the first end surface 12e of the multilayer body 12, a portion of the first main surface 12a, and a portion of the second main surface 12b. In this case, the first external electrode 24a is electrically connected to the first extension electrode portion 20a of the first internal electrode layer 16a. The first external electrode 24a is disposed on the second principal surface 12b with a protective layer 32 (described later) in between them. The first external electrode 24a may be or may not be disposed on a portion of the first side surface 12c or a portion of the second side surface 12d.

The second external electrode 24b is disposed over the second end surface 12f of the multilayer body 12, a portion of the first main surface 12a, and a portion of the second main surface 12b. In this case, the second external electrode 24b is electrically connected to the second extension electrode portion 20b of the second internal electrode layer 16b. The second external electrode 24b is disposed on the second principal surface 12b with the protective layer 32 (described later) in between them. The second external electrode 24b may be or may not be disposed on a portion of the first side surface 12c or a portion of the second side surface 12d.

In the multilayer body 12, capacitance is produced between the first counter electrode portion 18a of the first internal electrode layer 16a and the second counter electrode portion 18b of the second internal electrode layer 16b, which face each other with the ceramic layer 14 in between them. Therefore, capacitance is produced between the first external electrode 24a connected to the first internal electrode layer 16a and the second external electrode 24b connected to the second internal electrode layer 16b to provide capacitance characteristics.

The foundation electrode layers 26 include a first foundation electrode layer 26a1, a second foundation electrode layer 26a2, a third foundation electrode layer 26b1, and a fourth foundation electrode layer 26b2. The first foundation electrode layer 26a1, the second foundation electrode layer 26a2, the third foundation electrode layer 26b1, and the fourth foundation electrode layer 26b2 are provided by stacking a plurality of thin film electrodes to improve performance.

The first foundation electrode layer 26a1 covers a portion of the first main surface 12a, which is adjacent to the first end surface 12e of the multilayer body 12. The second foundation electrode layer 26a2 covers a portion of the second main surface 12b, which is adjacent to the first end surface 12e of the multilayer body 12. The second foundation electrode layer 26a2 is disposed on the second main surface 12b with the protective layer (described later) in between them.

The third foundation electrode layer 26b1 covers a portion of the first main surface 12a, which is adjacent to the second end surface 12f of the multilayer body 12. The fourth foundation electrode layer 26b2 covers a portion of the second main surface 12b, which is adjacent to the second end surface 12f of the multilayer body 12. The fourth foundation electrode layer 26b2 is disposed on the second main surface 12b with the protective layer 32 (described later) in between them.

Each foundation electrode layer 26 includes at least one selected from a baked layer, a thin film layer, and the like.

The foundation electrode layer 26 including a thin film layer is preferably formed by thin film deposition, such as sputtering or vapor deposition, for example. In particular, the foundation electrode layer 26 including a thin film layer is preferably a sputtered electrode formed by sputtering. Hereinafter, the electrode formed by sputtering will be described.

The sputtered electrode as the foundation electrode layer 26 is preferably provided on a portion of the first main surface 12a and a portion of the second main surface 12b of the multilayer body 12.

The sputtered electrode provided as the foundation electrode layer 26 preferably includes at least one selected from Ni, Cr, Cu, and the like, for example.

The sputtered electrode preferably has a thickness of, for example, about 50 nm or more and about 400 nm or less, and more preferably about 50 nm or more and about 130 nm or less in the height direction x connecting the first main surface 12a and the second main surface 12b.

A sputtered electrode may be provided as the foundation electrode layer 26 on a portion of the first main surface 12a and a portion of the second main surface 12b of the multilayer body 12. In this case, a baked layer is preferably provided as the foundation electrode layer 26 on the first end surface 12e and the second end surface 12f, or the plated layers 28 including the first plated layer 28a and the second plated layer 28b (described later) are preferably provided directly on the first end surface 12e and the second end surface 12f without the foundation electrode layer 26.

When a baked layer is provided as the foundation electrode layer 26 on the first end surface 12e and the second end surface 12f, the foundation electrode layer 26 may extend not only over the first end surface 12e and the second end surface 12f, but also over a portion of the first main surface 12a and a portion of the second main surface 12b. The sputtered electrode may also overlap the foundation electrode layer 26.

The baked layer provided as the foundation electrode layer 26 on the first end surface 12e preferably has a thickness of, for example, about 1 μm or more and about 5 μm or less in the longitudinal direction z connecting the first end surface 12e and the second end surface 12f.

When the baked layer is provided as the foundation electrode layer 26 on the first end surface 12e, the baked electrode layer preferably includes a ceramic component, instead of a glass component, or preferably includes both ceramic and glass components, for example.

Alternatively, the baked layer provided as the foundation electrode layer 26 preferably includes a metallic component and one or both of a glass component and a ceramic component. The glass component includes at least one selected from B, Si, Ba, Mg, Al, Li, and the like, for example. The metallic component includes, for example, at least one selected from Cu, Ni, Ag, Pd, Ag—Pd alloy, Au, and the like, for example. The ceramic component may include a material the same as or different from the ceramic material in the ceramic layers 14. The ceramic component preferably includes, for example, at least one selected from $BaTiO_3$, $CaTiO_3$, $(Ba,Ca)TiO_3$, $SrTiO_3$, $CaZrO_3$, and the like. The baked layer may have a multilayer structure.

Since the multilayer ceramic electronic component according to the present preferred embodiment is designed to be the multilayer ceramic capacitor 10, the foundation electrode layer includes metallic and ceramic components. Such a design is non-limiting. Specifically, the foundation electrode layer may include a different ceramic component when the multilayer ceramic electronic component is designed to include a piezoelectric ceramic, a semiconductor ceramic, or a magnetic ceramic as described above.

The baked layer as the foundation electrode layer 26 may be formed by applying, to the multilayer body, an electrically conductive paste including glass and metallic components and baking the paste. The paste may be baked simultaneously with the internal electrode layers 16 and the ceramic layers 14 or baked after the internal electrode layers 16 and the ceramic layers 14 are fired. When the baked layer, the internal electrode layers 16, and the ceramic layers 14 are formed through simultaneous firing, the baked layer preferably includes a ceramic material instead of a glass component or both a ceramic material and a glass component, for example.

A first foundation electrode layer and a second foundation electrode layer (baked layers) respectively on the first end surface 12e and the second end surface 12f preferably have a thickness (end center thickness) of, for example, about 15 μm or more and about 160 μm or less in the direction connecting the first end surface 12e and the second end surface 12f at the center in the height direction x connecting the first main surface 12a and the second main surface 12b.

When foundation electrode layers (baked layers) are also provided on a portion of the first main surface 12a and a portion of the second main surface 12b, a first foundation electrode layer and a second foundation electrode layer (baked layers) respectively on the first main surface 12a and the second main surface 12b preferably have a thickness (e dimension center thickness) of, for example, about 5 μm or more and about 40 μm or less in the height direction x connecting the first main surface 12a and the second main surface 12b at the center or approximate center in the longitudinal direction z connecting the first end surface 12e and the second end surface 12f.

Plated Layers

The plated layers 28 include a first plated layer 28a and a second plated layer 28b. As shown in FIG. 4, the first plated layer 28a and the second plated layer 28b may each have a multilayer structure. The first plated layer 28a and the second plated layer 28b each preferably include, for example, Ni, Sn, Cu, Ag, Pd, Ag—Pd alloy, Au, or the like.

The plated layers 28 may have a multilayer structure. The plated layers 28 preferably cover the foundation electrode layer 26.

When the multilayer ceramic capacitor 10 is mounted on the surface of a mounting board, the plated layers 28 preferably have a two-layer structure including, for example, plated Ni and plated Sn in order. The plated Ni layer prevents the foundation electrode layer 26 from being eroded by solder used during the mounting of the multilayer ceramic capacitor 10. The plated Sn layer facilitates the mounting by improving the wettability of solder used during the mounting of the multilayer ceramic capacitor 10. A plated Cu layer may also be provided between the foundation electrode layer 26 and the plated Ni layer or between the plated Ni layer and the multilayer body 12 when the plated layers 28 are provided directly on the multilayer body 12 without the foundation electrode layer 26 in between. This structure prevents infiltration of the plating solution and other aqueous materials.

The present preferred embodiment shows a three-layer structure (see FIG. 4) including a lower plated layer 30 of plated Cu, an intermediate plated layer 132 of plated Ni, and an upper plated layer 134 of plated Sn, as a preferred example of the structure including the first plated layer 28a and the second plated layer 28b. The plated layers 28 (plated Cu and Ni layers) including plated Cu and plated Ni covering the foundation electrode layer 26 prevent the foundation electrode layer 26 from being eroded by solder used during the mounting of the multilayer ceramic capacitor 10. Further, the plated layer of Sn (plated Sn layer) provided on the surface of the plated Ni layer facilitates the mounting by improving the wettability of solder used during the mounting of the multilayer ceramic capacitor 10.

In the present preferred embodiment, the first plated layer 28a includes a first lower plated layer 30a of plated Cu, a first intermediate plated layer 132a of plated Ni, and a first upper plated layer 134a of plated Sn. The first plated layer 28a covers the first foundation electrode layer 26a1 and the second foundation electrode layer 26a2.

In the present preferred embodiment, the second plated layer 28b includes a second lower plated layer 30b of plated Cu, a second intermediate plated layer 132b of plated Ni, and a second upper plated layer 134b of plated Sn. The second plated layer 28b covers the third and fourth foundation electrode layers 26b1 and 26b2.

In the first plated layer 28a and the second plated layer 28b of the plated layers 28, the first lower plated layer 30a, the first intermediate plated layer 132a, the first upper plated layer 134a, the second lower plated layer 30b, the second intermediate plated layer 132b, and the second upper plated layer 134b each preferably have a thickness of, for example, about 2 μm or more and about 15 μm or less. More specifically, the first lower plated layer 30a and the second lower plated layer 30b of plated Cu preferably have an average thickness of, for example, about 5 μm or more and about 8 μm or less, the first intermediate plated layer 132a and the second intermediate plated layer 132b of plated Ni preferably have an average thickness of, for example, about 2 μm or more and about 4 μm or less, and the first upper plated layer 134a and the second upper plated layer 134b of plated Sn preferably have an average thickness of, for example, about 2 μm or more and about 4 μm or less.

Although not shown, the plated layers 28 also preferably include, for example, a plated Cu layer as an outermost layer when the multilayer ceramic capacitor 10 is to be embedded in a board.

Protective Layer

As described above, the multilayer ceramic capacitor 10 as a multilayer ceramic electronic component according to the present preferred embodiment includes the protective layer 32 that includes a carbon material and is provided on at least the first main surface 12a or the second main surface 12b of the multilayer body 12. Hereinafter, specific features of the protective layer 32 will be described.

As shown in FIGS. 1 to 5, the protective layer 32 is provided on the second main surface 12b (lower surface in the drawings) in the present preferred embodiment. The protective layer 32 is made of a carbon material.

Although not shown, the protective layer 32 may be provided only on the first main surface 12a of the multilayer body 12.

The protective layer 32 on the surface of the multilayer body 12 as an element body has high mechanical strength and seals defects, such as microcracks, as potential ceramic fracture starting points. Thus, the protective layer 32 provides a sufficient level of mechanical strength to the multilayer ceramic electronic component.

Further, the protective layer 32 preferably has a carbon (C) content of, for example, about 70 atm % or more determined through exclusion of the contents of hydrogen, oxygen, and halogen, and preferably has a sp3 percentage of, for example, about 10% or more as an index of C—C bond type. With these features, the protective layer 32 has strong C—C bonds providing a three-dimensionally cross-linked structure and thus has higher mechanical strength, which is effective to improve the strength of the multilayer ceramic electronic component.

In this regard, if the carbon content of the protective layer 32 is less than about 70 atm % determined through exclusion of the contents of hydrogen, oxygen, and halogen, the density of strong C—C bonds can be low so that the protective layer 32 can have reduced mechanical strength, which may be less effective to improve the strength of the multilayer ceramic capacitor.

If the protective layer 32 has a sp3 percentage of less than about 10% as an index of C—C bond type, the protective layer 32 can have a higher sp2 percentage, which indicates the type of C—C bonds planarly spreading, so that the protective layer 32 may lose the three-dimensionally cross-linked structure and have reduced mechanical strength, which may be less effective to improve the strength of the multilayer ceramic electronic component.

The element content of the protective layer 32 may be measured by the method described below. Specifically, the element content of the protective layer 32 may be evaluated by X-ray photoelectron spectroscopy (XPS). First, wide scan spectroscopy may be used to detect the elements included in the protective layer 32, and then narrow scan spectroscopy may be used for quantitative analysis. The resulting element contents may be used to calculate the carbon content through exclusion of the contents of hydrogen and helium, which are out of the measurement range, the content of oxygen as an impurity, and the content of halogen as an additive element not contributing to the strength.

The sp3 percentage of the protective layer 32 as an index of C—C bond type may be measured by the method described below. Specifically, the percentage as an index of C—C bond type in the protective layer may be evaluated by C—K edge X-ray absorption near edge structure (XANES) spectroscopy. Total electron yield measurement may be used for the evaluation by C—K edge XANES spectroscopy. The X-ray incidence angle may be 55 degrees with respect to the horizontal direction of the sample. The resulting spectrum may be separated into peaks for $\pi^*$ (C=C), $\pi^*$ (e.g., C=O), $\pi^*$ (e.g., C—H), $\pi^*$ (e.g., C—C), and $\pi^*$ (C=C). The ratio sp3/(sp2+sp3) may be calculated using the value of $\pi^*(\pi^*+$ σ*) for each peak area and the coefficient calculated from that value and the value of the standard sample.

The protective layer 32 made of a carbon material preferably includes diamond-like carbon (DLC), for example.

The protective layer 32 of DLC is a layer called a carbon film or a hydrogenated amorphous carbon film (a-C:H), which is intended to also include a hard carbon film. The protective layer 32 of DLC is an amorphous carbon layer also having sp3 bonds. The protective layer 32 of DLC may be provided using a hydrocarbon gas, such as methane or acetylene gas, as a raw material gas. DLC may also be doped with a heterogeneous element, such as Si or halogen, for example. In that case, a Si- or halogen-containing raw material gas may be used. Methods for deposition of DLC for the protective layer 32 may be broadly divided into physical vapor deposition (PVD) and chemical vapor deposition (CVD), for example. Any of these deposition techniques may be used in preferred embodiments of the present invention.

The ratio of the area of the protective layer 32 to the area of the first main surface 12a and the ratio of the area of the protective layer 32 to the area of the second main surface 12b are each preferably about 20% or more, for example. This feature can reduce the thermal and mechanical stress on the surface of the multilayer body 12 as an element body being subjected to mounting or reflow, which can more reliably achieve the advantageous effects. In preferred embodiments of the present invention, the protective layer 32 is more preferably disposed over the entire or substantially the entire of the first main surface 12a or the second main surface 12b (the ratio of the area of the protective layer 32 to the first main surface 12a or the second main surface 12b is more preferably 100%).

The protective layer 32 preferably has a thickness of, for example, about 0.1 μm or more. This feature can reduce the thermal and mechanical stress on the surface of the element being subjected to mounting or reflow, which can more reliably achieve about the advantageous effects.

The thickness of the protective layer 32 may be measured by the method described below. To measure the thickness of the protective layer 32, the multilayer ceramic capacitor 10 may be polished, and the resulting exposed section may be subjected to the measurement.

Specifically, first, the LT surface of the multilayer ceramic capacitor 10 may be polished parallel or substantially parallel to the first side surface 12c or the second side surface 12d until the polished surface reaches the ½ W position. Next, in the polished section, the dimension of the protective layer 32 in the height direction T connecting the first main surface 12a and the second main surface 12b may be measured at the ½ L position in the longitudinal direction L connecting the first end surface 12e and the second end surface 12f using a digital microscope (e.g., VHX-5000 manufactured by KEYENCE CORPORATION).

According to this present preferred embodiment, the protective layer 32 provided on the outer side of the multilayer body 12 can increase the strength and thus effectively prevent surface cracking. According to this present preferred embodiment, the strength can be improved without any reinforcement layer provided inside the multilayer body 12, which makes it possible to provide a small-volume multilayer ceramic electronic component, in other words, a compact multilayer ceramic electronic component, maintaining basic electric performance.

Moreover, the structure described above does not have any unnecessary level differences on the outer surface, which makes it possible to provide a multilayer ceramic electronic component having a necessary and sufficient level of strength and having outer dimensions maintained as small as possible.

The dimension of the multilayer ceramic capacitor 10 in the longitudinal direction z according to the present preferred embodiment is referred to as the L dimension. The L dimension is preferably about 0.2 mm or more and about 10 mm or less, for example. The dimension of the multilayer ceramic capacitor 10 in the height direction x according to the present preferred embodiment is referred to as the T dimension. The T dimension is preferably about 35 μm or more and about 250 μm or less, for example. The dimension of the multilayer ceramic capacitor 10 in the width direction y according to the present preferred embodiment is referred to as the W dimension. The W dimension is preferably about 0.1 mm or more and about 10 mm or less, for example.

2. Method for Manufacturing Multilayer Ceramic Electronic Component

Hereinafter, a non-limiting example of a method for manufacturing a multilayer ceramic capacitor as an example of the multilayer ceramic electronic component according to the present preferred embodiment will be described.

(i) First provided are dielectric sheets for forming the ceramic layers 14 and an electrically conductive paste for forming the internal electrode layers 16. The dielectric sheets and the electrically conductive paste for forming the internal electrode layers 16 include a binder and a solvent. The binder and the solvent may be those known in the art.

(ii) The electrically conductive paste for forming the internal electrode layers 16 is printed in a predetermined pattern on each dielectric sheet by, for example, screen printing or gravure printing, to form an internal electrode pattern. Specifically, the paste including an electrically conductive material is applied onto each dielectric sheet by the printing method to form an electrically conductive paste layer. The paste including an electrically conductive material is a mixture including a metal powder, an organic binder, and an organic solvent. Also prepared are dielectric sheets for outer layers with no internal electrode pattern printed, namely, dielectric sheets for forming the first outer layer portion 15b1 and the second outer layer portion 15b2.

(iii) A multilayer sheet is prepared using the dielectric sheets prepared in the step (ii). Specifically, a multilayer sheet is prepared by stacking a predetermined number of the dielectric sheets for outer layers with no internal electrode pattern; alternately stacking, on the sheets, ceramic green sheets each including an internal electrode pattern corresponding to the first internal electrode layer 16a and ceramic green sheets each including an internal electrode pattern corresponding to the second internal electrode layer 16b; and stacking a predetermined number of the dielectric sheets for outer layers with no internal electrode pattern.

(iv) The multilayer sheet is pressed in the stacking direction by, for example, isostatic pressing to form a multilayer block.

(v) The multilayer block is cut into multilayer chips with a predetermined size. Each multilayer chip may be rounded at its corners and ridges by barrel polishing or the like.

(vi) Each multilayer chip is fired so that the multilayer body 12 is obtained. The firing temperature is preferably about 900° C. or more and about 1400° C. or less, for example, although it depends on the dielectric material for the ceramic layers 14 and the material for the internal electrode layers 16.

(vii) Subsequently, the protective layer 32 is formed. For example, to form the protective layer 32 of DLC, an aliphatic hydrocarbon, an aromatic hydrocarbon, an oxygenated hydrocarbon, a nitrogen-containing hydrocarbon, or the like, which is gas or liquid at room temperature, is used as a raw material gas for the protective layer 32. In particular, a raw material gas having six or more carbon atoms is preferred, such as benzene, toluene, o-xylene, m-xylene, p-xylene, or cyclohexane. These raw materials may be used alone, or two or more of these raw materials may be used in the form of a mixed gas. These gases may also be diluted with a noble gas, such as, for example, argon or helium, before use. To form the protective layer 32 of silicon-doped DLC, a Si-containing hydrocarbon gas may be used. To deposit a SiOx film, a Si-containing hydrocarbon gas and oxygen may be supplied and used through gas introduction pipes. Other metal oxide films may be deposited in a similar manner in which oxygen and a raw material gas containing the corresponding metal are used.

The film may be deposited by any of various deposition methods, such as, for example, ionization deposition, arc ion plating, high-frequency, high-voltage superimposed pulse deposition, plasma booster technique, and plasma CVD. For example, a plasma CVD process includes supplying a hydrocarbon gas, such as methane or acetylene, to a cathode in vacuum to turn the gas into a plasma and to decompose the gas; and allowing carbon ions resulting from the decomposition to collide with the target.

Formation of Thin Film Layer as Foundation Electrode Layer (viii) Subsequently, the foundation electrode layers 26 each including a thin film electrode layer are formed on a portion of the first main surface 12a and a portion of the second main surface 12b of the multilayer body 12. The foundation electrode layer in the form of a thin film layer may be formed by, for example, sputtering or the like. In other words, the foundation electrode layer in the form of a thin film layer may include a sputtered electrode.

When a sputtered electrode is formed as the foundation electrode layer 26 on a portion of the first main surface 12a and a portion of the second main surface 12b of the multilayer body 12, a baked layer is preferably formed as the foundation electrode layer 26 on the first end surface 12e and the second end surface 12f, or the plated layers 28 including a first plated layer 28a and a second plated layer 28b are preferably formed directly on the first and end surface 12e and the second end surface 12f without formation of the foundation electrode layer 26.

When a baked layer is formed as the foundation electrode layer 26 on the first end surface 12e and the second end surface 12f, the foundation electrode layer 26 may extend not only over the first end surface 12e and the second end surface 12f but also over a portion of the first main surface 12a and a portion of the second main surface 12b. The sputtered electrode may also overlap the foundation electrode layer 26.

In the multilayer ceramic capacitor 10 shown in FIG. 1, the plated layers 28 including the first plated layer 28a and the second plated layer 28b (described below) are provided directly on the first end surface 12e and the second end surface 12f without the foundation electrode layer 26 in between.

The thin film layer preferably includes, for example, at least one selected from Mg, Al, Ti, W, Cr, Cu, Ni, Ag, Co, Mo, and V. In this case, the foundation electrode layer 26 can have high bonding strength to the multilayer body 12. The thin film layer may have a monolayer or multilayer structure.

More preferably, the thin film layer has a two-layer structure including a NiCr layer and a NiCu layer, for example.

(ix) Subsequently, the plated layers 28 including the first plated layer 28a and the second plated layer 28b are formed as needed on the foundation electrode layer 26 and the surface of the multilayer body 12. In the present preferred embodiment, the plated layer 28 is formed as a three-layer structure including plated Cu, Ni, and Sn layers (see FIG. 4).

Formation of Baked Layer as Foundation Electrode Layer (viii) Alternatively, to form a baked layer as the foundation electrode layer 26, an electrically conductive paste is applied onto the first end surface 12e and the second end surface 12f of the multilayer body 12. An electrically conductive paste including glass and metallic components may be applied by, for example, such a method as dipping and then baked to form a baked layer as the foundation electrode layer 26. In this step, the baking temperature is preferably about 700° C. or more and about 900° C. or less, for example.

The baked layer formed as the foundation electrode layer 26 preferably further includes a ceramic component. For example, the ceramic component is preferably the same or substantially the same type as the ceramic material of the multilayer body 12. A process for forming the baked layer including a ceramic component preferably includes applying the electrically conductive paste to the unfired multilayer chip; and simultaneously baking the multilayer chip and the electrically conductive paste on the multilayer chip to form a baked layer-carrying multilayer body. The same method as that in the step (vii) may also be used to form the protective layer 32 on the multilayer body 12 obtained after the baked layer is formed by simultaneously baking the multilayer chip and the electrically conductive paste thereon.

(ix) Subsequently, the plated layers 28 including the first plated layer 28a and the second plated layer 28b are formed as needed on the surface of the baked layer.

The manufacturing method described above makes it possible to manufacture the multilayer ceramic capacitor according to the present preferred embodiment with high quality and high performance.

Modifications

Hereinafter, modifications (first to fifth modifications) of preferred embodiments of the present invention will be described. In the description of each modification, the same or similar elements as those in the above-described preferred embodiment will be denoted by the same reference signs, and a detailed description thereof will be omitted.

First Modification

Figure 6:
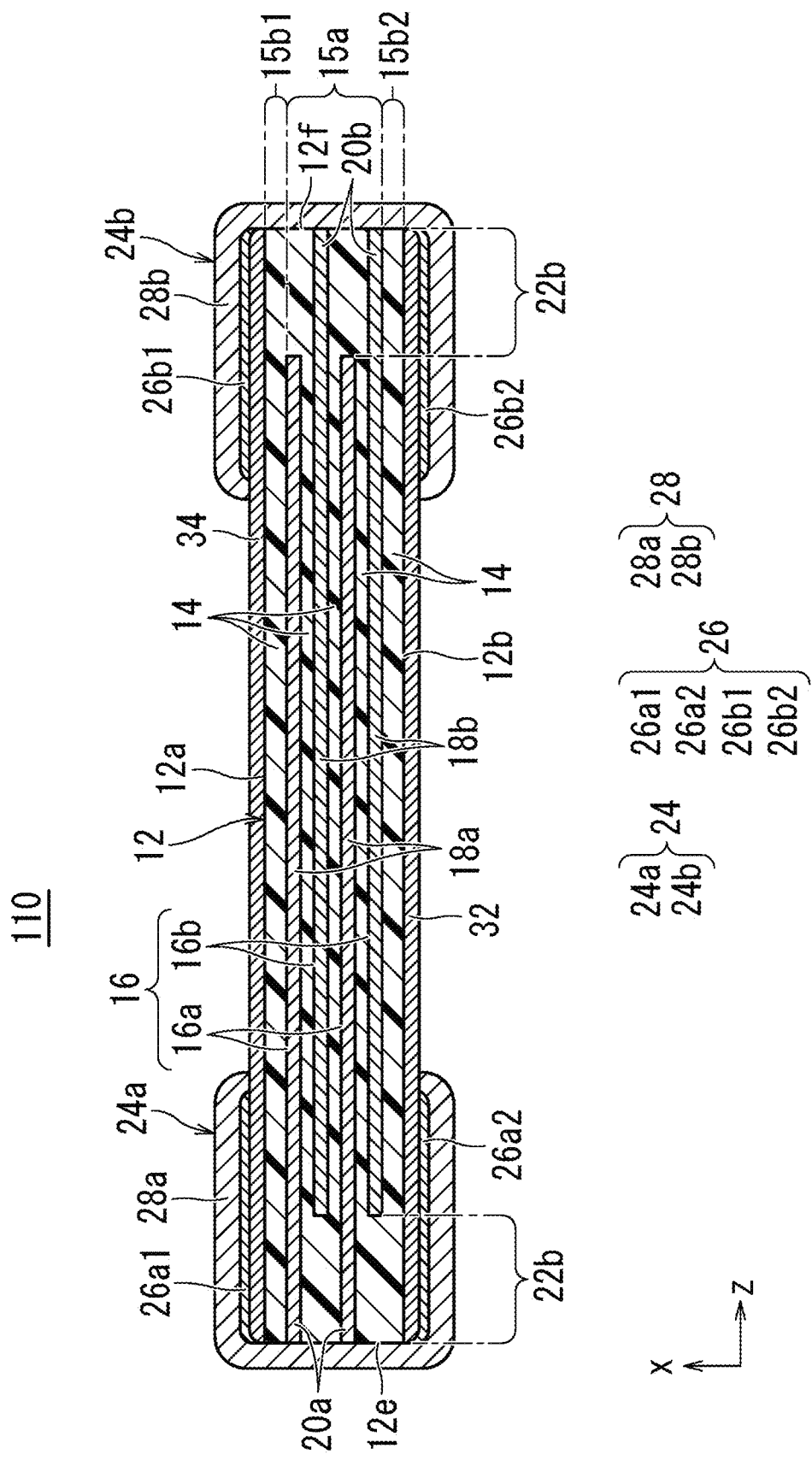
FIG. 6 is a central front cross-sectional view showing a multilayer ceramic capacitor as an example of a multilayer ceramic electronic component according to a first modification of a preferred embodiment of the present invention.

A multilayer ceramic capacitor 110 as a multilayer ceramic electronic component according to a first modification of the above-described preferred embodiment will be described below. As shown in FIG. 6, the multilayer ceramic capacitor 110 according to the first modification includes protective layers 32 and 34 disposed on the first main surface 12a and the second main surface 12b.

Accordingly, in the first modification, the protective layer 34 is further provided on the first main surface 12a, while the protective layer 32 is provided only on the second main surface 12b in the above-described preferred embodiment. In other words, the multilayer body 12 is sandwiched between upper and lower DLC layers.

This feature improves the mechanical strength of the center of both surfaces of the multilayer body 12 and the ends of the external electrodes 24 in the chip, namely, the multilayer ceramic capacitor. This is effective in improving the resistance to thermal and mechanical stress, which occurs during reflow and the mounting of the chip.

The formation of the protective layers 32 and 34 on the second main surface 12b and the first main surface 12a can also eliminate the need to select the direction in which the multilayer ceramic electronic component is to be mounted on a mounting board.

Second Modification

Figure 7:
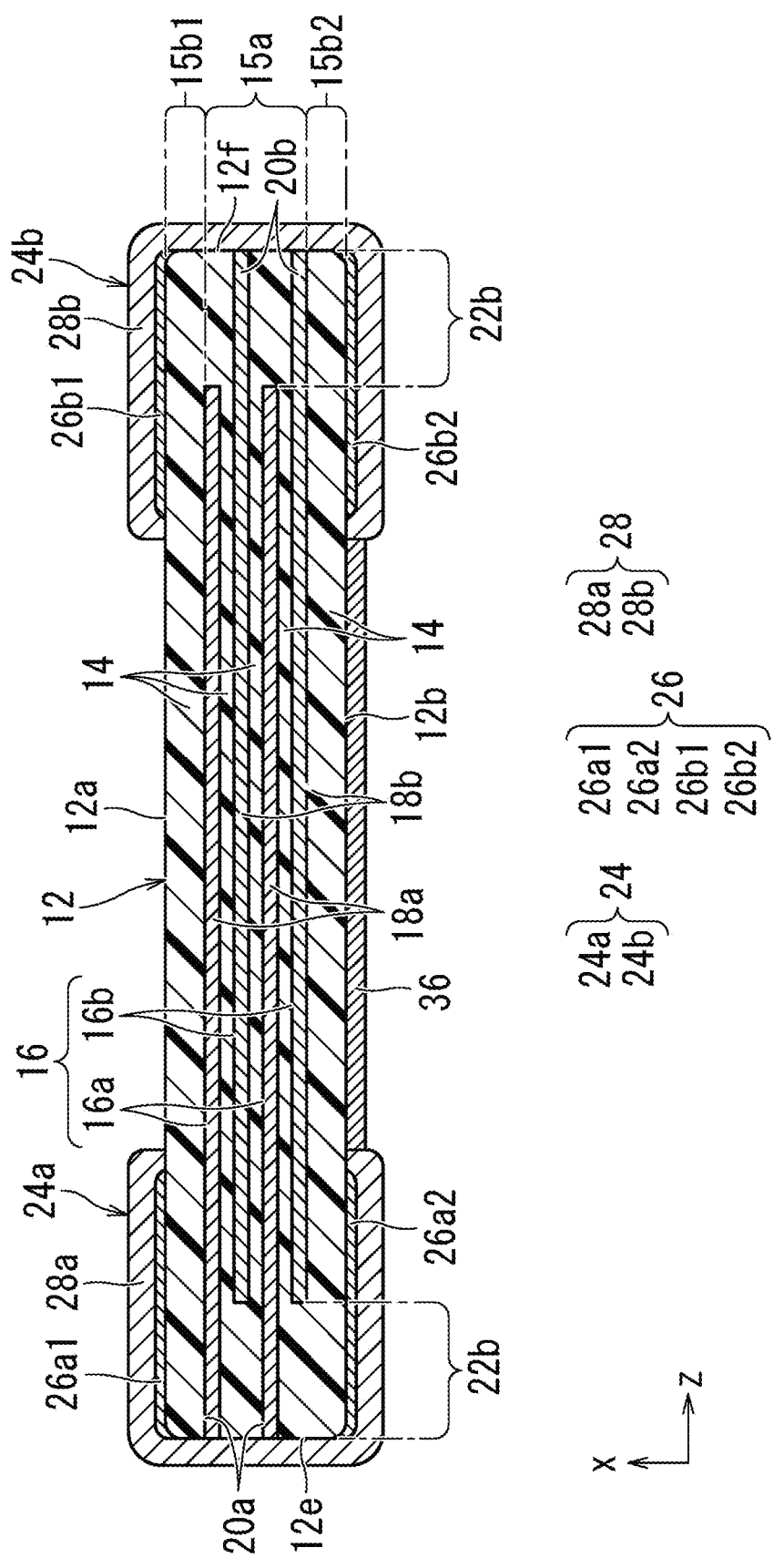
FIG. 7 is a central front cross-sectional view showing a multilayer ceramic capacitor as an example of a multilayer ceramic electronic component according to a second modification of a preferred embodiment of the present invention.

Next, a multilayer ceramic capacitor 210 as a multilayer ceramic electronic component according to a second modification will be described. As shown in FIG. 7, the multilayer ceramic capacitor 210 according to the second modification includes a gap protective layer 36.

Specifically, as shown in FIG. 7, the multilayer ceramic capacitor 210 as a multilayer ceramic electronic component according to the second modification includes the first external electrode 24a disposed on the first end surface 12e and extending from the first end surface 12e to a portion of the first main surface 12a and a portion of the second main surface 12b; and the second external electrode 24b disposed on the second end surface 12f and extending from the second end surface 12f to a portion of the first main surface 12a and a portion of the second main surface 12b.

The gap protective layer 36, which functions similarly to the protective layer 32, is disposed on a portion of the multilayer body 12 between the first external electrode 24a and the second external electrode 24b on a portion of the second main surface 12b. Alternatively, the gap protective layer 36 may be disposed on a portion of the multilayer body 12 between the first external electrode 24a and the second external electrode 24b on a portion of the first main surface 12a. While the multilayer ceramic electronic component according to the second modification includes the gap protective layer 36 disposed only on the second main surface 12b (one of the main surfaces) as shown in FIG. 7, the gap protective layer may also be disposed on the first main surface 12a (the other of the main surfaces), namely, the gap protective layers may be disposed on the two main surfaces 12a and 12b.

The gap protective layer 36 disposed on the multilayer body 12 improves the mechanical strength of the center of the multilayer body 12 as an element body. Therefore, the gap protective layer 36 is effective in improving the resistance to thermal and mechanical stress, which occurs during reflow and the mounting of the chip. The gap protective layer 36 can also be applied to a multilayer ceramic capacitor provided as a finished product with no protective layer, so that the process cost can be reduced.

Third Modification

Figure 8:
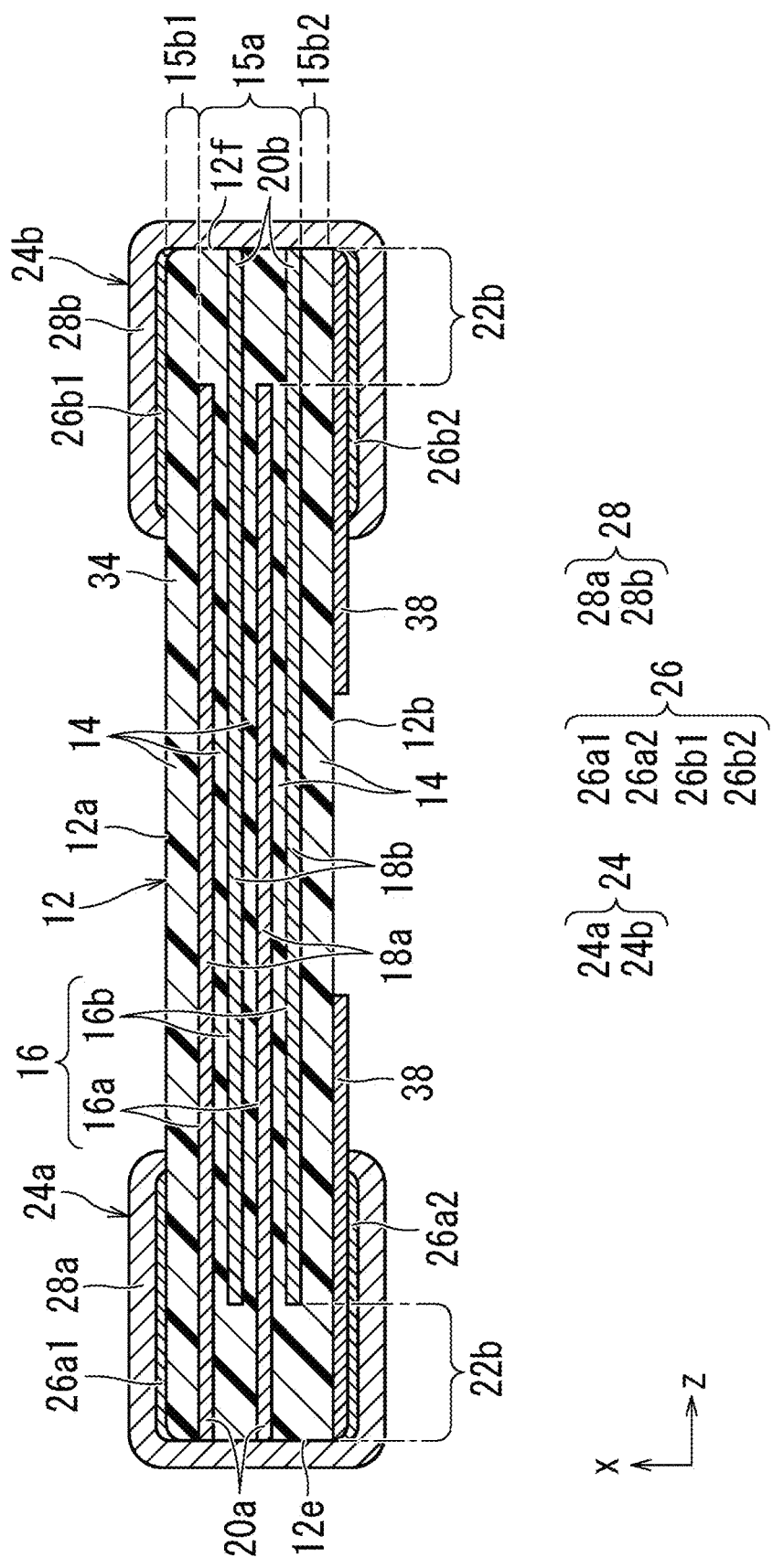
FIG. 8 is a central front cross-sectional view showing a multilayer ceramic capacitor as an example of a multilayer ceramic electronic component according to a third modification of a preferred embodiment of the present invention.

Next, a multilayer ceramic capacitor 310 as a multilayer ceramic electronic component according to a third modification will be described. As shown in FIG. 8, the multilayer ceramic capacitor 310 according to the third modification includes an end protective layer 38.

Specifically, as shown in FIG. 8, the multilayer ceramic capacitor 310 as a multilayer ceramic electronic component according to the third modification includes the first external electrode 24a disposed on the first end surface 12e and extending from the first end surface 12e to a portion of the first main surface 12a and a portion of the second main surface 12b; and the second external electrode 24b disposed on the second end surface 12f and extending from the second end surface 12f to a portion of the first main surface 12a and a portion of the second main surface 12b.

The end protective layer 38, which has the same or substantially the same function as the protective layer 32, is disposed on a portion of the second main surface 12b at the interface between the first external electrode 24a and the multilayer body 12 and extends over a partial area of the multilayer body 12 in which the first external electrode 24a is not provided. The end protective layer 38 is also disposed on a portion of the second main surface 12b at the interface between the second external electrode 24b and the multilayer body 12 and extends over a partial area of the multilayer body 12 in which the second external electrode 24b is not provided. On the second main surface 12b, the end protective layer 38 on the first end 12e side is spaced apart from the end protective layer 38 on the second end 12f side. Alternatively, the end protective layer 38 may be disposed on a portion of the first main surface 12a at the interface between the first external electrode 24a and the multilayer body 12 to extend over a partial area of the multilayer body 12 in which the first external electrode 24a is not provided, and may be disposed on a portion of the first main surface 12a at the interface between the second external electrode 24b and the multilayer body 12 to extend to a partial area of the multilayer body 12 in which the second external electrode 24b is not provided. While the end protective layer 38 is disposed only on the second main surface 12b (one of the main surfaces) as shown in FIG. 8, the end protective layer may also be disposed on the first main surface 12a (the other of the main surfaces), namely, the end protective layers may be disposed on the two main surfaces 12a and 12b.

The end protective layer 38 improves the mechanical strength of the end of the external electrode 24. Therefore, the end protective layer 38 can effectively impart, to one surface, improved resistance to thermal and mechanical stress, which occurs during reflow and the mounting of the chip, and can reduce the costs required to reduce the surface area for film deposition.

Fourth Modification

Figure 9:
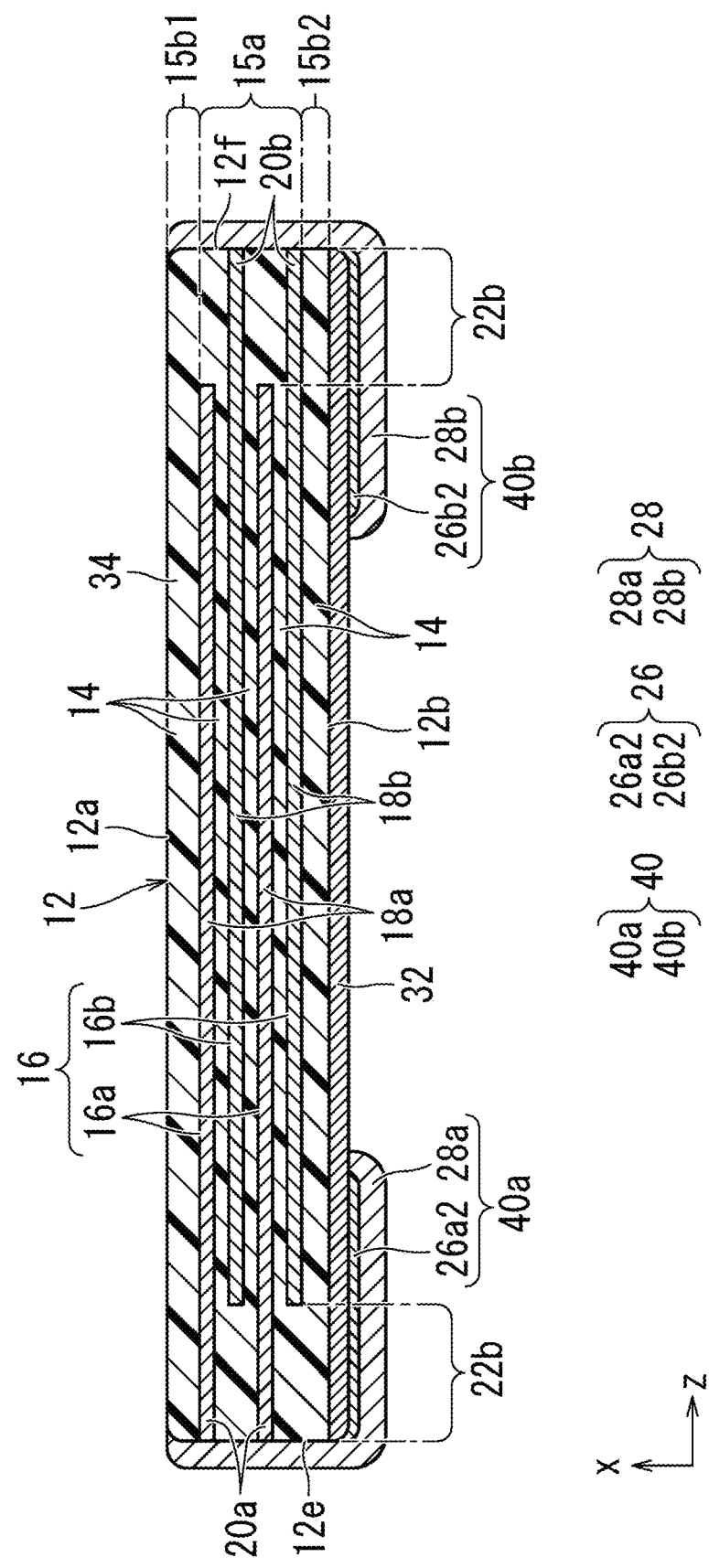
FIG. 9 is a central front cross-sectional view showing a multilayer ceramic capacitor as an example of a multilayer ceramic electronic component according to a fourth modification of a preferred embodiment of the present invention.

Next, a multilayer ceramic capacitor 410 as a multilayer ceramic electronic component according to a fourth modification will be described. As shown in FIG. 9, the multilayer ceramic capacitor 410 according to the fourth modification includes L-shaped external electrodes 40. The L-shaped external electrodes 40 include a first L-shaped external electrode 40a and a second L-shaped external electrode 40b.

Specifically, as shown in FIG. 9, the multilayer ceramic capacitor 410 as a multilayer ceramic electronic component according to the fourth modification includes the first L-shaped external electrode 40a disposed on the first end surface 12e, extending from the first end surface 12e, and disposed on the second main surface 12b with the protective layer 32 in between them. The first L-shaped external electrode 40a may also include a portion extending over a portion of the first main surface 12a. As shown in FIG. 9, the multilayer ceramic capacitor 410 also includes the second L-shaped external electrode 40b disposed on the second end surface 12f, extending from the second end surface 12f, and disposed on the second main surface 12b with the protective layer 32 in between them. The second L-shaped external electrode 40b may also include a portion extending over a portion of the first main surface 12a. In this case, the protective layer 32 is disposed on the second main surface 12b of the multilayer body 12.

Alternatively, the first L-shaped external electrode 40a may be disposed on the first end surface 12e, extend from the first end surface 12e, and be disposed on the first main surface 12a with the protective layer in between them, and the second L-shaped external electrode 40b may be disposed on the second end surface 12f, extend from the second end surface 12f, and be disposed on the first main surface 12a with the protective layer in between them. In this case, the first L-shaped external electrode 40a may also include a portion extending over a portion of the second main surface 12*b*, and the second L-shaped external electrode 40*b* may also include a portion extending over a portion of the second main surface 12*b*. In this case, the protective layer is disposed on the first main surface 12*a* of the multilayer body 12.

This feature makes it possible to improve the mechanical strength of the center of the multilayer body 12 as an element body and the mechanical strength of the end portions of the L-shaped external electrodes 40. This feature is effective in improving the resistance to thermal and mechanical stress, which occurs during reflow and the mounting of the chip, and can reduce the height of the element to be mounted.

Fifth Modification

Figure 10:
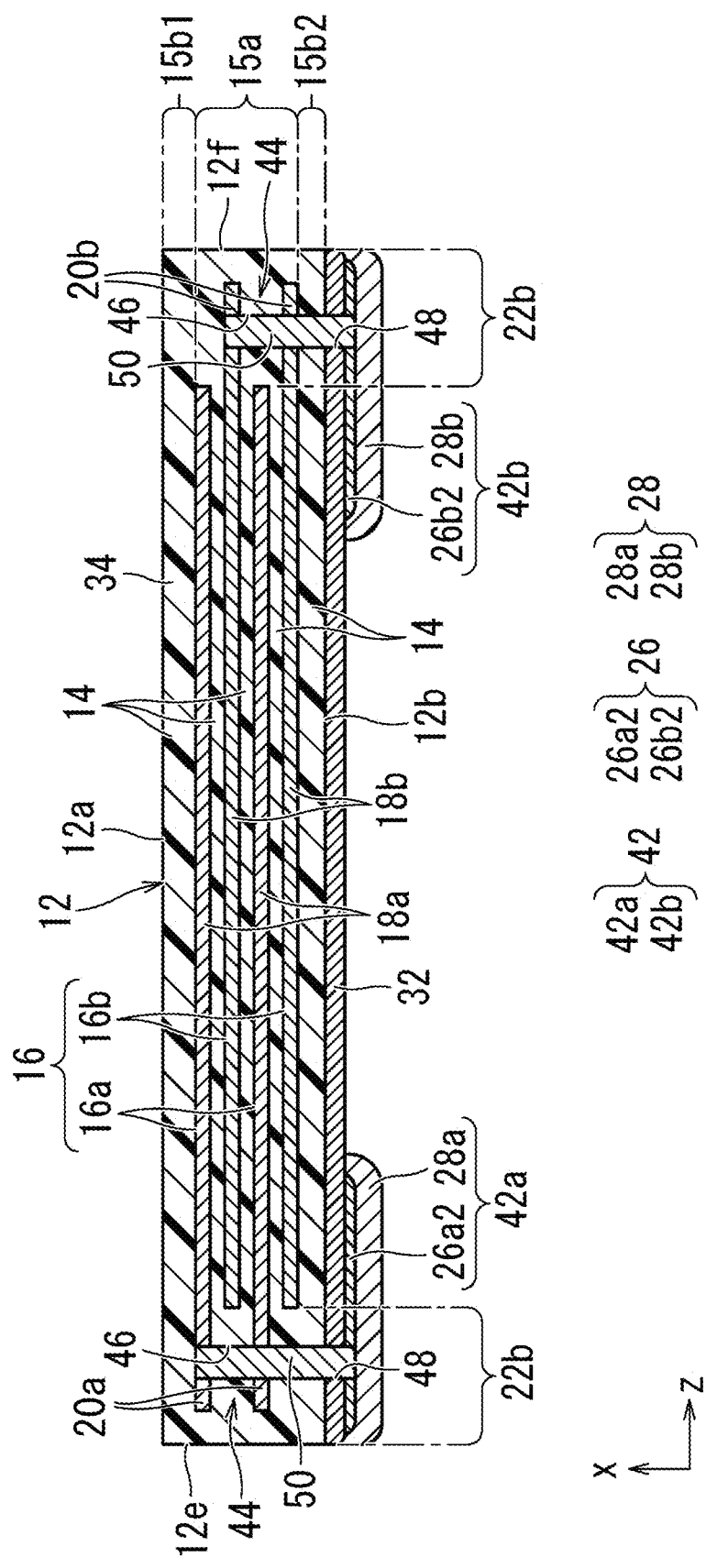
FIG. 10 is a central front cross-sectional view showing a multilayer ceramic capacitor as an example of a multilayer ceramic electronic component according to a fifth modification of a preferred embodiment of the present invention.

Next, a multilayer ceramic capacitor 510 as a multilayer ceramic electronic component according to a fifth modification will be described. As shown in FIG. 10, the multilayer ceramic capacitor 510 according to the fifth modification includes main surface external electrodes 42 and via connection areas 44. The main surface external electrodes 42 include a first main surface external electrode 42*a* and a second main surface external electrode 42*b*.

As shown in FIG. 10, each internal electrode layer 16 is not exposed at each end surface in the multilayer ceramic capacitor 510 as a multilayer ceramic electronic component according to the fifth modification.

The first internal electrode layer 16*a* includes a first counter electrode portion 18*a* facing the second internal electrode layer 16*b*; and a first extension electrode portion 20*a* provided as an end portion of the first internal electrode layer 16*a* to extend from the first counter electrode portion 18*a* toward the first end surface 12*e* of the multilayer body 12. The end of the first extension electrode portion 20*a* is not exposed at the first end surface 12*e*.

The second internal electrode layer 16*b* includes a second counter electrode portion 18*b* facing the first internal electrode layer 16*a*; and a second extension electrode portion 20*b* provided as an end portion of the second internal electrode layer 16*b* to extend from the second counter electrode portion 18*b* toward the second end surface 12*f* of the multilayer body 12. The end of the second extension electrode portion 20*b* is not exposed at the second end surface 12*f*.

As shown in FIG. 10, the multilayer ceramic capacitor 510 as a multilayer ceramic electronic component according to the fifth modification includes the first main surface external electrode 42*a* disposed on the second main surface 12*b*, which is to be used for mounting, to be adjacent to the first end surface 12*e* with the protective layer 32 in between them. The first main surface external electrode 42*a* may also include a portion extending over a portion of the first end surface 12*e*. In this case, as shown in FIG. 10, the via connection area 44 electrically connects the first main surface external electrode 42*a* to the first extension electrode portion 20*a* of the first internal electrode layer 16*a*. As shown in FIG. 10, the multilayer ceramic capacitor 510 as a multilayer ceramic electronic component according to the fifth modification also includes the second main surface external electrode 42*b* disposed on the second main surface 12*b*, which is to be used for mounting, to be adjacent to the second end surface 12*f* with the protective layer 32 in between them. The second main surface external electrode 42*b* may also include a portion extending over a portion of the second end surface 12*f*. In this case, as shown in FIG. 10, the via connection area 44 electrically connects the second main surface external electrode 42*b* to the second extension electrode portion 20*b* of the second internal electrode layer 16*b*. In this case, the protective layer 32 is disposed on the second main surface 12*b* of the multilayer body 12.

Alternatively, the first main surface 12*a* may be used for mounting. In this case, the first main surface external electrode 42*a* may be disposed on the first main surface 12*a* to be adjacent to the first end surface 12*e* with the protective layer in between them, and the second main surface external electrode 42*b* may be disposed on the first main surface 12*a* to be adjacent to the second end surface 12*f* with the protective layer 32 in between them. The first main surface external electrode 42*a* may also include a portion extending over a portion of the first end surface 12*e*, and the second main surface external electrode 42*b* may also include a portion extending over a portion of the second end surface 12*f*. In this case, the protective layer is disposed on the first main surface 12*a* of the multilayer body 12.

Both the first main surface 12*a* and the second main surface 12*b* may be used for mounting. In this case, the main surface external electrodes 42 are disposed on the first main surface 12*a* and the second main surface 12*b* to be adjacent to the first end surface 12*e* and the second end surface 12*f*. In this case, the main surface external electrodes 42 may also include portions extending over a portion of the first end surface 12*e* and a portion of the second end surface 12*f*. The protective layers 32 may be disposed on both main surfaces. In this case, the via connection areas 44 also connect the internal electrode layers 16 to the main surface external electrodes 42.

As shown in FIG. 10, the via connection areas 44 provide electrical conduction between the internal electrodes 16 and the main surface external electrodes 42. Each via connection area 44 includes a multilayer body hole 46 provided in the multilayer body 12; a protective layer hole 48 provided in the protective layer 32 to communicate with the multilayer body hole 46; and a via connection body 50 provided in the multilayer body hole 46 and the protective layer hole 48 and connected to the main surface external electrode 42. The first main surface electrode 42*a* is electrically connected to the first extension electrode portion 20*a* of the first internal electrode layer 16*a* through the via connection body 50. The second main surface electrode 42*b* is electrically connected to the second extension electrode portion 20*b* of the second internal electrode layer 16*b* through the via connection body 50. The plan-view shape of the via connection areas 44 may not only be a circular or substantially circular shape but also any shape suitable for good electrical conduction, such as a rectangular, polygonal, or elliptical shape. The via connection areas 44 close to the first main surface external electrode 42*a* and the second main surface external electrode 42*b* may respectively have the same length or different lengths.

These features improve the mechanical strength of the center of the multilayer body 12 as an element body and the mechanical strength of the end of the main surface external electrodes 42. Therefore, these features are effective in improving the resistance to thermal and mechanical stress, which occurs during reflow and the mounting of the chip, and can reduce the height of the element to be mounted. These features can eliminate the filleting process so that the chip can be mounted close to an adjacent component.

It will be understood that the preferred embodiments described above are not intended to limit the present invention.

For example, while the preferred embodiments and modifications described above are bilaterally symmetrical in front view as shown in the drawings, the multilayer ceramic electric component according to preferred embodiments of the present invention may have a variety of outer shapes depending on the desired performance and the target on which the component is to be mounted. The present invention also encompasses any appropriate combinations of all or some of the features of the preferred embodiments and modifications described above.

It will be understood that the preferred embodiments and modifications described above may be changed or modified in various ways with respect to mechanism, shape, material, number, position, configuration, or the like without departing from the technical ideas of the preferred embodiments of the present invention and such modifications will fall within the scope of the present invention.

3. Experimental Examples

Hereinafter, experimental examples of preferred embodiments of the present invention will be described in detail. The experimental examples are not intended to limit the present invention at all.

Multilayer ceramic capacitors as multilayer ceramic electronic components were fabricated using the method described above and then subjected to evaluation of their strength by a transverse strength test.

In the experimental examples, sample Nos. 1 to 15 were prepared. Sample Nos. 4, 5, 7, 8, 9, 10, 12, 13, and 15 fall within the scope of the present invention. On the other hand, sample Nos. 1, 2, 3, 6, 11, and 14 are comparative examples, which do not fall within the scope of the present invention.

Specifications of the multilayer ceramic capacitors prepared as examples according to preferred embodiments of the present invention (sample Nos. 4, 5, 7, 8, 9, 10, 12, 13, and 15)

Multilayer ceramic capacitors having the structure shown in FIGS. 1 to 5 and the specifications shown below were fabricated using the method described in the preferred embodiment section.

Dimensions of the multilayer ceramic capacitor: L×W×T=about 0.6 mm×about 0.3 mm×about 0.05 mm (the thickness of the multilayer body: about 30 μm) (except for sample No. 15), and L×W×T=about 0.6 mm×about 0.3 mm×about 0.11 mm (the thickness of the multilayer body: about 80 μm) (sample No. 15) (two types)

Main component of the material of the ceramic layers: $BaTiO_3$

Protective layer: made of DLC (diamond-like carbon)

See Table 1 for the sp3 percentage as an index of C—C bond type and for the carbon (C) content.

Material of the internal electrode layers: Ni

Structure of the external electrodes:

Foundation electrode layer mainly including Ni—Cr alloy deposited by sputtering; and Three plated layers composed of (from the multilayer body side) plated Cu layer, plated Ni layer, and plated Sn layer As comparative examples, sample Nos. 2, 3, 1, and 14 were fabricated. Sample Nos. 2 and 3 were multilayer ceramic capacitors fabricated as disclosed in Japanese Unexamined Patent Application, Publication No. 2012-44149 and including reinforcement layers inside each of the first outer layer portion and the second outer layer portion. Sample Nos. 1 and 14 were multilayer ceramic capacitors not including the protective layer according to preferred embodiments of the present invention. The specifications of each comparative example will be described below. Sample Nos. 6 and 11 have the same specifications as those of the examples, except that sample No. 6 has a carbon content out of the range according to the present invention and sample No. 11 has a sp3 percentage as an index of C—C bond type out of the range according to the present invention.

Specifications of multilayer ceramic capacitors of sample Nos. 1 and 14 were fabricated as comparative examples.

As comparative examples, multilayer ceramic capacitors not having the protective layer according to preferred embodiments of the present invention were fabricated. Sample Nos. 1 and 14 were fabricated having the same or substantially the same specifications as those of the examples, except that the protective layer according to preferred embodiments of the present invention was not provided.

Dimensions of the multilayer ceramic capacitor: L×W×T=about 0.6 mm×about 0.3 mm×about 0.05 mm (the thickness of the multilayer body: about 30 μm) (sample No. 1), and L×W×T=about 0.6 mm×about 0.3 mm×about 0.11 mm (the thickness of the multilayer body: about 80 μm) (sample No. 14) (two types)

Main component of the material of the ceramic layers: $BaTiO_3$

Material of the internal electrode layers: Ni

Structure of the external electrodes:

Foundation electrode layer mainly including Ni—Cr alloy deposited by sputtering; and Three plated layers composed of (from the multilayer body side) plated Cu layer, plated Ni layer, and plated Sn layer Specifications of multilayer ceramic capacitors of sample Nos. 2 and 3 were fabricated as comparative examples.

As comparative examples, multilayer ceramic capacitors including reinforcement layers in each of a first outer layer portion and a second outer layer portion were fabricated. Sample Nos. 2 and 3 were fabricated having the same or substantially the same specifications as those of the examples, except that they had reinforcement layers.

Dimensions of the multilayer ceramic capacitor: L×W×T=about 0.6 mm×about 0.3 mm×about 0.05 mm (the thickness of the multilayer body: about 30 μm)

Main component of the material of the ceramic layers: $BaTiO_3$

Material of the internal electrode layers: Ni

Structure of the external electrodes:

Foundation electrode layer mainly including Ni—Cr alloy deposited by sputtering; and Three plated layers composed of (from the multilayer body side) plated Cu layer, plated Ni layer, and plated Sn layer Reinforcement layers: two reinforcement layers disposed in each of the first outer layer portion and the second outer layer portion and formed using the same Ni paste as used for the internal electrode layers Transverse Strength Test A transverse strength test using a three-point bending test was performed to evaluate the samples. In the test, the support base was made of stainless steel, and the distance between the support points was about 0.5 mm. The pressing rod was made of stainless steel and had a hemispherical tip with R=about 0.05 mm. The sample was placed on the center of the support base, and the pressing rod was brought into contact with the center of the top surface of the sample. A downward external force was applied to push down the pressing rod until the sample was destroyed. The magnitude of the external force was about 2.0 N and about 0.5 N respectively for the multilayer ceramic capacitors with T dimensions of about 110 μm and about 40 μm. The number of samples for each measurement was 20, in which the number of destroyed samples, which were determined to be defective, was counted.

Method for Measuring the C Content of the Protective Layer (Method for Determining the Presence or Absence of the Protective Layer)

The C content of the protective layer was evaluated by XPS. The system used was Quantum 2000 manufactured by ULVAC-PHI, Inc. First, the elements included in the sample were detected using wide scan spectroscopy. Next, narrow scan spectroscopy was used for quantitative analysis in which the contents of elements exclusive of hydrogen and helium, which were out of the XPS detection range, were determined. The resulting element contents were used to calculate the content of the element other than hydrogen, oxygen, and halogen.

Method for Determining Sp3 Percentage as an Index of C—C Bond Type

The sp3 percentage as an index of C—C bond type was evaluated by C—K edge XANES spectroscopy. In the experimental facility, Aichi Synchrotron Radiation Center, the BLIN2 beamline was used for the evaluation. Total electron yield measurement was used for the evaluation. The X-ray incidence angle was about 55 degrees with respect to the horizontal direction of the sample. The resulting spectrum was separated into peaks for $\pi^*$ (C=C), $\pi^*$ (e.g., C=O), $\pi^*$ (e.g., C—H), $\pi^*$ (e.g., C—C), and $\pi^*$ (C=C). The ratio sp3/(sp2+sp3) was calculated using the value of $\pi^*$ ($\pi^*+\sigma^*$) for each peak area and the coefficient calculated from that value and the value of the standard sample.

Method for Measuring the Thickness of the Protective Layer

To measure the thickness of the protective layer, the multilayer ceramic capacitor sample was polished, and the resulting exposed section was subjected to the measurement. Specifically, first, the LT surface of the multilayer ceramic capacitor sample was polished parallel or substantially parallel to the first side surface or the second side surface until the polished surface reached the ½ W position. Next, in the polished section, the thickness of the protective layer in the height direction x connecting the first main surface and the second main surface was measured at the ½ L position in the longitudinal direction z connecting the first end surface and the second end surface using a digital microscope (VHX-5000 manufactured by KEYENCE CORPORATION). The same method was used to measure the thickness of the reinforcement layers in sample Nos. 2 and 3.

Method for Measuring the Thickness of the Multilayer Body

To measure the thickness of the multilayer body, the multilayer ceramic capacitor sample was polished, and the resulting exposed section was subjected to the measurement. Specifically, first, the LT surface of the multilayer ceramic capacitor sample was polished substantially parallel to the first side surface or the second side surface until the polished surface reached the ½ W position. Next, in the polished section, the dimension of the multilayer body in the height direction x connecting the first main surface and the second main surface was measured at the ½ L position in the longitudinal direction z connecting the first end surface and the second end surface of the multilayer ceramic capacitor using a digital microscope (VHX-5000 manufactured by KEYENCE CORPORATION).

Method for Measuring the Thickness of the Effective Layer Portion

To measure the thickness of the effective layer portion, the multilayer ceramic capacitor sample was polished, and the resulting exposed section was subjected to the measurement. Specifically, first, the LT surface of the multilayer ceramic capacitor sample was polished substantially parallel to the first side surface or the second side surface until the polished surface reached the ½ W position. Next, in the polished section, the dimension between the internal electrode layer closest to the first main surface and the internal electrode closest to the second main surface in the height direction x connecting the first main surface and the second main surface was measured at the ½ L position in the longitudinal direction z connecting the first end surface and the second end surface of the multilayer ceramic capacitor using a digital microscope (VHX-5000 manufactured by KEYENCE CORPORATION).

Method for Measuring Capacitance

The capacitance of the multilayer ceramic capacitor of each sample No. was measured under the conditions according to the standard (JIS C 5101-11998) using a capacitance measurement device (LCR meter).

Test Results

Table 1 shows the results of the tests described above.

TABLE 1

| | CONDITIONS | | | | | | | RESULTS | |
|---|---|---|---|---|---|---|---|---|---|
| SAMPLE NO. | MULTI-LAYER BODY THICK-NESS (μm) | PRESENCE OR ABSENCE OF PRO-TECTIVE LAYER | CARBON CONTENT (atm %) ※ | SP3 C-C BOND PERCENT-AGE (%) | PRO-TECTIVE LAYER THICK-NESS (μm) | REINFORCE-MENT LAYER THICK-NESS (μm) | EFFECTIVE LAYER PORTION THICK-NESS (μm) | TRANS-VERSE STRENGTH TEST | CAPAC-ITANCE (μF) |
| 1 (COMPARATIVE EXAMPLES) | 31.2 | ABSENT | — | — | — | — | 11.3 | 20/20 | 0.021 |
| 2 (COMPARATIVE EXAMPLES) | 31.3 | ABSENT | — | — | — | 5.2 | 10.8 | 8/20 | 0.020 |
| 3 (COMPARATIVE EXAMPLES) | 29.9 | ABSENT | — | — | — | 8.5 | 2.5 | 0/20 | 0.005 |
| 4 | 30.1 | PRESENT | 96 | 47 | 5.1 | — | 10.4 | 0/20 | 0.018 |
| 5 | 30.3 | PRESENT | 71 | 45 | 4.9 | — | 10.6 | 0/20 | 0.019 |
| 6 (COMPARATIVE EXAMPLES) | 30.2 | PRESENT | 54 | 43 | 4.7 | — | 10.4 | 11/20 | 0.019 |
| 7 | 31.1 | PRESENT | 96 | 82 | 5.2 | — | 11.4 | 0/20 | 0.020 |
| 8 | 30.5 | PRESENT | 96 | 68 | 5.4 | — | 10.8 | 0/20 | 0.020 |
| 9 | 30.4 | PRESENT | 96 | 25 | 5.1 | — | 10.7 | 0/20 | 0.020 |
| 10 | 30.7 | PRESENT | 96 | 10 | 5.1 | — | 11.0 | 0/20 | 0.020 |
| 11 (COMPARATIVE | 30.5 | PRESENT | 96 | 5 | 5.1 | — | 10.7 | 5/20 | 0.019 |

TABLE 1-continued

| | CONDITIONS | | | | | | | RESULTS | |
|---|---|---|---|---|---|---|---|---|---|
| SAMPLE NO. | MULTI-LAYER BODY THICKNESS (μm) | PRESENCE OR ABSENCE OF PROTECTIVE LAYER | CARBON CONTENT (atm %) ✻ | SP3 C-C BOND PERCENTAGE (%) | PROTECTIVE LAYER THICKNESS (μm) | REINFORCEMENT LAYER THICKNESS (μm) | EFFECTIVE LAYER PORTION THICKNESS (μm) | TRANSVERSE STRENGTH TEST | CAPACITANCE (μF) |
| EXAMPLES) | | | | | | | | | |
| 12 | 30.9 | PRESENT | 96 | 47 | 0.1 | — | 11.1 | 0/20 | 0.020 |
| 13 | 31.4 | PRESENT | 96 | 47 | 0.03 | — | 11.6 | 3/20 | 0.021 |
| 14 (COMPARATIVE EXAMPLES) | 80.5 | ABSENT | — | — | — | — | 60.9 | 20/20 | 0.108 |
| 15 | 80.2 | PRESENT | 96 | 47 | 5 | — | 60.2 | 0/20 | 0.106 |

* ELEMENT CONTENT DETERMINED THROUGH EXCLUSION OF HYDROGEN, OXYGEN, AND HALOGEN CONTENTS

The results in Table 1 above will be explained individually for each of sample Nos. 1 to 15.

Sample No. 1

Sample No. 1 is a comparative example. Sample No. 1 does not include the protective layer (DLC) according to a preferred embodiment of the present invention. As a result, all of the 20 samples were determined to be defective in the transverse strength test.

Sample No. 2

Sample No. 2 is a comparative example. Sample No. 2 does not include the protective layer according to a preferred embodiment of the present invention. Sample No. 2 includes reinforcement layers inside the multilayer body as disclosed in Japanese Unexamined Patent Application, Publication No. 2012-44149, instead of the protective layer. As a result, 8 of the 20 samples were determined to be defective in the transverse strength test.

Sample No. 3

Sample No. 3 is a comparative example. Sample No. 3 does not include the protective layer according to a preferred embodiment of the present invention. Sample No. 3 includes reinforcement layers inside the multilayer body as disclosed in Japanese Unexamined Patent Application, Publication No. 2012-44149, instead of the protective layer. In sample No. 3, the reinforcement layer had a thickness of about 8.5 μm. In order to ensure that other portions (the multilayer body) of sample No. 3 had the same or substantially the same thickness as that in other samples, the thickness of the effective layer portion of sample No. 3 was reduced to about 2.5 μm, which was the thinnest among all samples. As a result, the multilayer ceramic capacitor was designed to have a capacitance of about 0.005 μF, which was the smallest.

Japanese Unexamined Patent Application, Publication No. 2012-44149, showing the design of sample No. 3, discloses that reinforcement layers made of Ni or the like are provided inside the multilayer body. Unfortunately, such reinforcement layers, which differ in material from the protective layer 32 according to a preferred embodiment of the preferred embodiment, will inevitably increase the thickness of the electronic component itself if the effective layer portion of the electronic component is ensured to have a certain volume. Moreover, such reinforcement layers may fail to ensure a sufficient volume of the effective portion of the electronic component if the electronic component is downsized to a desired size while the necessary strength is ensured. However, in each example where the multilayer ceramic capacitor has the features according to a preferred embodiment of the preferred embodiment, the thickness of the effective layer portion, even including the thickness of the protective layer 32, can be maintained thinner than that in the structure of Japanese Unexamined Patent Application, Publication No. 2012-44149. Therefore, it has been discovered that, according to preferred embodiments of the preferred embodiment, the volume capacitance density can be increased while the volume of the effective layer portion is increased.

The results of sample Nos. 2 and 3 show that, even if reinforcement layers are provided inside the multilayer body to increase the mechanical strength, the resulting mechanical strength may be insufficiently improved (sample No. 2), or the resulting multilayer ceramic capacitor may fail to satisfy a necessary level of capacitance (sample No. 3).

Sample No. 4

Sample No. 4 is an example according to a preferred embodiment of the present invention. Sample No. 4 includes the protective layer according to a preferred embodiment of the present invention. As a result, the 20 multilayer ceramic capacitor samples were determined to be not defective in the transverse strength test and satisfied the necessary level of capacitance.

Sample No. 5

Sample No. 5 is an example according to a preferred embodiment of the present invention. Sample No. 5 includes the protective layer according to a preferred embodiment of the present invention. As a result, the 20 multilayer ceramic capacitor samples were determined to be not defective in the transverse strength test and satisfied the necessary level of capacitance.

Sample No. 6

Sample No. 6 is a comparative example. Sample No. 6 includes a protective layer on the surface of the multilayer body. However, the protective layer of sample No. 6 has a carbon content of about 54 atm %, which is out of the range according to a preferred embodiment of the present invention. As a result of the transverse strength test, 11 of the 20 samples were determined to be defective and found not to satisfy the desired level of mechanical strength.

Sample No. 7

Sample No. 7 is an example according to a preferred embodiment of the present invention. Sample No. 7 includes the protective layer according to a preferred embodiment of the present invention. As a result, the 20 multilayer ceramic capacitor samples were determined to be not defective in the transverse strength test and satisfied the necessary level of capacitance.

Sample No. 8

Sample No. 8 is an example according to a preferred embodiment of the present invention. Sample No. 8 includes the protective layer according to a preferred embodiment of the present invention. As a result, the 20 multilayer ceramic capacitor samples were determined to be not defective in the transverse strength test and satisfied the necessary level of capacitance.

Sample No. 9

Sample No. 9 is an example according to a preferred embodiment of the present invention. Sample No. 9 has the protective layer according to a preferred embodiment of the present invention. As a result, the 20 multilayer ceramic capacitor samples were determined to be not defective in the transverse strength test and satisfied the necessary level of capacitance.

Sample No. 10

Sample No. 10 is an example according to a preferred embodiment of the present invention. Sample No. 10 includes the protective layer according to a preferred embodiment of the present invention. As a result, the 20 multilayer ceramic capacitor samples were determined to be not defective in the transverse strength test and satisfied the necessary level of capacitance.

Sample No. 11

Sample No. 11 is a comparative example. Sample No. 11 include a protective layer on the surface of the multilayer body. However, the protective layer of sample No. 11 has a sp3 percentage of about 5% as an index of C—C bond type, which is out of the range according to a preferred embodiment of the present invention. As a result of the transverse strength test, 5 of the 20 samples were determined to be defective and found not to satisfy the desired level of mechanical strength.

Sample No. 12

Sample No. 12 is an example according to a preferred embodiment of the present invention. Sample No. 12 includes the protective layer according to a preferred embodiment of the present invention. As a result, the 20 multilayer ceramic capacitor samples were determined to be not defective in the transverse strength test and satisfied the necessary level of capacitance. In addition, sample No. 12 has a protective layer thickness of about 0.1 µm, which is the thinnest among the examples. This shows that preferred embodiments of the present invention are effective in reducing the thickness and size of multilayer ceramic capacitors.

Sample No. 13

Sample No. 13 is an example according to a preferred embodiment of the present invention. Sample No. 13 includes a protective layer on the surface of the multilayer body. However, the thickness of the protective layer of sample No. 13 is about 0.03 µm, which is thinner than that of the other examples. As a result, 3 of the 20 samples were determined to be not good, but found to satisfy the desired level of mechanical strength.

Sample No. 14

Sample No. 14 is a comparative example. In sample No. 14, the thickness of the multilayer body is about 80 µm. Sample No. 14 does not include the protective layer according to a preferred embodiment of the present invention. As a result of the transverse strength test with an external force of about 2.0 N, which differs from that for sample Nos. 1 to 13, all of the 20 samples were determined to be defective and found not to have the desired level of mechanical strength.

Sample No. 15

Sample No. 15 is an example according to a preferred embodiment of the present invention. In sample No. 15, the thickness of the multilayer body is about 80 µm. Sample No. 15 includes the protective layer according to a preferred embodiment of the present invention. As a result, the 20 multilayer ceramic capacitor samples were determined to be not defective in the transverse strength test with an external force of about 2.0 N, which differs from that for sample Nos. 1 to 13, and found to satisfy the necessary level of capacitance.

In each example within the scope of the present invention, the protective layer made of a carbon material is provided on the second main surface of the multilayer body, the protective layer has a carbon (C) content of at least about 70 atm % determined through exclusion of the contents of hydrogen, oxygen, and halogen, and the protective layer has a sp3 percentage of at least about 10% as an index of C—C bond type. The results shown above have demonstrated that, according to these features, the protective layer can have strong C—C bonds providing a three-dimensionally cross-linked structure and have higher mechanical strength to allow the multilayer ceramic capacitor to have a sufficient level of mechanical strength. It has also be discovered that, when the protective layer made of a carbon material is provided on the second main surface of the multilayer body, the protective layer has a carbon (C) content of at least about 70 atm % determined through exclusion of the contents of hydrogen, oxygen, and halogen, and the protective layer has a sp3 percentage of at least about 10% as an index of C—C bond type, the protective layer can be thinner than that in the conventional art so that the volume capacitance density can be increased while the volume of the effective layer portion is increased.

Preferred embodiments of the present invention relates to multilayer ceramic electronic components, and specifically multilayer ceramic electronic components each including an external electrode of a multilayer structure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a multilayer body including a plurality of ceramic layers that are stacked and a plurality of internal electrode layers each stacked on the plurality of ceramic layers and including a first main surface and a second main surface on opposite sides in a height direction, a first end surface and a second end surface on opposite sides in a longitudinal direction perpendicular or substantially perpendicular to the height direction, and a first side surface and a second side surface on opposite sides in a width direction perpendicular or substantially perpendicular to the height and longitudinal directions;
a first external electrode on the multilayer body;
a second external electrode on the multilayer body; and
a protective layer at least on the first main surface or the second main surface of the multilayer body; wherein
the protective layer includes a carbon material with a carbon content of about 70 atm % or more determined through exclusion of hydrogen, oxygen, and halogen contents, and a sp3 percentage of about 10% or more as an index of C—C bond type.

2. The multilayer ceramic electronic component according to claim 1, wherein the protective layer is provided on each of the first main surface and the second main surface.

3. The multilayer ceramic electronic component according to claim 1, wherein the first external electrode is provided on a portion of the first main surface or a portion of the second main surface;

the second external electrode is provided on a portion of the first main surface or a portion of the second main surface; and the protective layer is provided on a portion of the multilayer body between the first external electrode on a portion of the first main surface or a portion of the second main surface and the second external electrode on a portion of the first main surface or a portion of the second main surface.

4. The multilayer ceramic electronic component according to claim 1, wherein the first external electrode is provided on a portion of the first main surface or a portion of the second main surface;

the second external electrode is provided on a portion of the first main surface or a portion of the second main surface;

the protective layer is provided at an interface between the first external electrode and the multilayer body and extends over a portion of the multilayer body in which the first external electrode is not provided; and the protective layer is provided at an interface between the second external electrode and the multilayer body and extends over a portion of the multilayer body in which the second external electrode is not provided.

5. The multilayer ceramic electronic component according to claim 1, wherein the protective layer has an area ratio of about 20% or more with respect to the first main surface or the second main surface.

6. The multilayer ceramic electronic component according to claim 1, wherein the protective layer has a thickness of about 0.1 μm or more.

7. The multilayer ceramic electronic component according to claim 1, wherein the multilayer body has a thickness of about 10 μm or more and about 200 μm or less.

8. The multilayer ceramic electronic component according to claim 1, wherein the protective layer includes diamond-like carbon.

9. The multilayer ceramic electronic component according to claim 1, wherein no other protective layer to increase strength is included inside the multilayer body.

10. The multilayer ceramic electronic component according to claim 1, wherein each of the plurality of ceramic layers is made of a dielectric ceramic mainly including $BaTiO_3$, $CaTiO_3$, $SrTiO_3$, or $CaZnO_3$.

11. The multilayer ceramic electronic component according to claim 10, wherein each of the plurality of ceramic layers includes at least one of a Mn compound, an Fe compound, a Cr compound, a Co compound, or a Ni compound as a subcomponent.

12. The multilayer ceramic electronic component according to claim 1, wherein each of the plurality of ceramic layers has a thickness of about 0.4 μm or more and about 10 μm or less.

13. The multilayer ceramic electronic component according to claim 1, wherein the protective layer is disposed only on the second main surface.

14. The multilayer ceramic electronic component according to claim 1, wherein the plurality of internal electrode layers include first internal electrode layers extending to the first end surface, and second internal electrode layers extending to the second end surface.

15. The multilayer ceramic electronic component according to claim 14, wherein the first external electrode is disposed on the first end surface and electrically connected to the first internal electrode layers, and the second external electrode is provided on the second end surface and electrically connected to the second internal electrode layers.

16. The multilayer ceramic electronic component according to claim 1, wherein the first external electrode includes first and second foundation layers and a first plating layer; and the second external electrode includes third and fourth foundation layers and a second plating layer.

17. The multilayer ceramic electronic component according to claim 16, wherein the first foundation layer covers a portion of the first main surface adjacent to the first end surface;

the second foundation layer covers a portion of the second main surface adjacent to the first end surface;

the third foundation layer covers a portion of the first main surface adjacent to the second end surface; and the fourth foundation layer covers a portion of the second main surface adjacent to the second end surface.

18. The multilayer ceramic electronic component according to claim 17, wherein each of the first, second, third, and fourth foundation layers is defined by a sputtered electrode.

19. The multilayer ceramic electronic component according to claim 1, wherein the sputtered electrode includes at least one of Ni, Cr, and Cu.

20. The multilayer ceramic electronic component according to claim 18, wherein the sputtered electrode has a thickness of about 50 nm or more and about 130 nm or less.

* * * * *